(12) United States Patent
MolavianJazi et al.

(10) Patent No.: US 12,225,528 B2
(45) Date of Patent: Feb. 11, 2025

(54) SCHEDULING ENHANCEMENTS FOR WIRELESS COMMUNICATION SYSTEMS

(71) Applicant: Samsung Electronics Co., Ltd., Suwon-si (KR)

(72) Inventors: Ebrahim MolavianJazi, Santa Clara, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 17/655,507

(22) Filed: Mar. 18, 2022

(65) Prior Publication Data
US 2022/0304026 A1 Sep. 22, 2022

Related U.S. Application Data

(60) Provisional application No. 63/164,340, filed on Mar. 22, 2021, provisional application No. 63/164,331, filed on Mar. 22, 2021.

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0061* (2013.01); *H04L 27/26025* (2021.01);
(Continued)

(58) Field of Classification Search
CPC ......... H04W 72/1273; H04W 72/1278; H04W 72/044; H04W 24/08; H04L 1/0061; H04L 27/26025
See application file for complete search history.

(56) References Cited

U.S. PATENT DOCUMENTS

2019/0334681 A1* 10/2019 Xu ............ H04L 1/0038
2020/0314678 A1* 10/2020 Lee ............ H04W 72/12
(Continued)

FOREIGN PATENT DOCUMENTS

WO 2020246858 A1 12/2020
WO 2021006618 A1 1/2021

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
(Continued)

*Primary Examiner* — Kent Krueger

(57) ABSTRACT

Apparatuses and methods for scheduling enhancements for wireless communication systems. A method for receiving physical downlink control channels (PDCCHs) includes receiving first information for first search space sets for scheduling on a first cell from the first cell and second information for second search space sets for scheduling on the first cell from a second cell. The method includes determining a first number of PDCCH receptions over a first number of non-overlapping control channel elements (CCEs) on the first cell in a first slot based on the first search space sets and identifying that at least one of the first number of PDCCH receptions exceeds a predetermined number of PDCCH receptions and the first number of non-overlapping CCEs exceeds a predetermined number of non-overlapping CCEs. The method further includes canceling PDCCH receptions corresponding only to third search space sets from the first search space sets.

18 Claims, 11 Drawing Sheets

(51) Int. Cl.
*H04L 27/26* (2006.01)
*H04W 24/08* (2009.01)
*H04W 72/044* (2023.01)
*H04W 72/20* (2023.01)

(52) U.S. Cl.
CPC ......... *H04W 24/08* (2013.01); *H04W 72/044* (2013.01); *H04W 72/20* (2023.01)

(56) References Cited

U.S. PATENT DOCUMENTS

| | | | | |
|---|---|---|---|---|
| 2021/0037607 | A1* | 2/2021 | Hamidi-Sepehr | H04W 24/08 |
| 2021/0058189 | A1* | 2/2021 | Xiao | H04L 1/0038 |
| 2021/0067268 | A1* | 3/2021 | Seo | H04L 25/0238 |
| 2021/0168774 | A1* | 6/2021 | Li | H04W 16/14 |
| 2022/0345918 | A1* | 10/2022 | Matsumura | H04W 24/08 |
| 2022/0369138 | A1* | 11/2022 | Matsumura | H04W 72/1273 |
| 2023/0070761 | A1* | 3/2023 | Kim | H04L 5/0053 |
| 2024/0089986 | A1* | 3/2024 | Matsumura | H04W 72/0446 |

OTHER PUBLICATIONS

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

"5G; NR; NR and NG-RAN Overall description; Stage-2 (3GPP TS 38.300 version 16.4.0 Release 16)", ETSI TS 138 300 V16.4.0, Jan. 2021, 151 pages.

"5G; NR; Requirements for support of radio resource management (3GPP TS 38.133 version 16.4.0 Release 16)", ETSI TS 138 133 V16.4.0, Aug. 2020, 1465 pages.

International Search Report and Written Opinion issued Jun. 17, 2022 regarding International Application No. PCT/KR2022/004013, 8 pages.

Huawei et al., "Discussion on SCell PDCCH scheduling P(S)Cell PDSCH or PUSCH", 3GPP TSG RAN WG1 Meeting #104-e, R1-2100193, Jan. 2021, 6 pages.

Extended European Search Report issued Apr. 11, 2024 regarding Application No. 22776069.1, 10 pages.

* cited by examiner

SCHEDULING ENHANCEMENTS FOR WIRELESS COMMUNICATION SYSTEMS

CROSS-REFERENCE TO RELATED APPLICATION AND CLAIM OF PRIORITY

This application claims priority under 35 U.S.C. § 119(e) to U.S. Provisional Pat. Application No. 63/164,331 filed on Mar. 22, 2021 and U.S. Provisional Pat. Application No. 63/164,340 filed on Mar. 22, 2021. The above-identified provisional patent applications are hereby incorporated by reference in their entirety.

TECHNICAL FIELD

The present disclosure relates generally to wireless communication systems and, more specifically, the present disclosure relates to scheduling enhancements for wireless communication systems including scheduling for dynamic spectrum sharing and cross-carrier scheduling enhancements.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to scheduling enhancements for wireless communication systems including scheduling for dynamic spectrum sharing and cross-carrier scheduling enhancements.

In one embodiment, a method for receiving physical downlink control channels (PDCCHs) is provided. The method includes receiving first information for first search space sets for scheduling on a first cell from the first cell and second information for second search space sets for scheduling on the first cell from a second cell. The method includes determining a first number of PDCCH receptions over a first number of non-overlapping control channel elements (CCEs) on the first cell in a first slot based on the first search space sets and identifying that at least one of the first number of PDCCH receptions exceeds a predetermined number of PDCCH receptions and the first number of non-overlapping CCEs exceeds a predetermined number of non-overlapping CCEs. The method further includes canceling PDCCH receptions corresponding only to third search space sets from the first search space sets.

In another embodiment, a user equipment (UE) is provided. The UE includes a transceiver configured to receive first information for first search space sets for scheduling on a first cell from the first cell and second information for second search space sets for scheduling on the first cell from a second cell. The UE further includes a processor operably coupled to the transceiver. The processor is configured to determine a first number of PDCCH receptions over a first number of non-overlapping CCEs on the first cell in a first slot based on the first search space sets and identify that at least one of the first number of PDCCH receptions exceeds a predetermined number of PDCCH receptions and the first number of non-overlapping CCEs exceeds a predetermined number of non-overlapping CCEs. The transceiver is further configured to cancel PDCCH receptions corresponding only to third search space sets from the first search space sets.

In yet another embodiment, a base station (BS) is provided. The BS includes a transceiver configured to transmit first information for first search space sets for scheduling on a first cell from the first cell, second information for second search space sets for scheduling on the first cell from a second cell, a scaling factor α that indicates a maximum number of PDCCHs and a maximum number of non-overlapping CCEs on the first cell in a first slot based on the first search space sets, and a PDCCH on the first cell or on the second cell in the first slot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art may understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
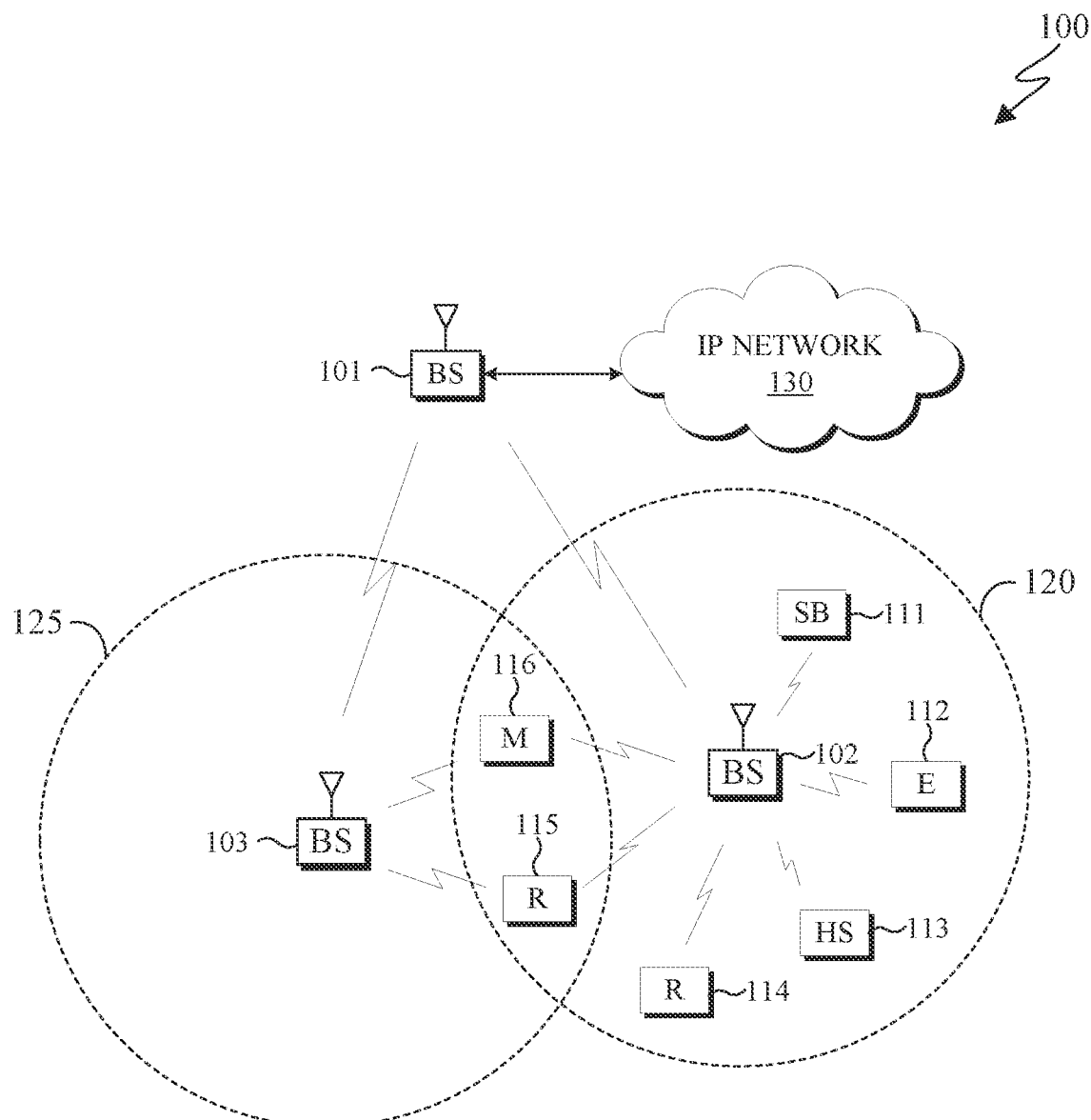
FIG. 1 illustrates an example wireless network according to embodiments of the present disclosure.

FIGS. 1 through 12, discussed below, and the various embodiments used to describe the principles of the present disclosure in this patent document are by way of illustration only and may not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.4.0, "NR; Physical channels and modulation" ("REF1"); 3GPP TS 38.212 Rel-16 v16.4.0, "NR; Multiplexing and channel coding" ("REF2"); 3GPP TS 38.213 Rel-16 v16.4.0, "NR; Physical layer procedures for control" ("REF3"); 3GPP TS 38.214 Rel-16 v16.4.0, "NR; Physical layer procedures for data" ("REF4"); 3GPP TS 38.321 Rel-16 v16.3.0, "NR; Medium Access Control (MAC) protocol specification" ("REF5"); 3GPP TS 38.331 Rel-16 v16.3.1, "NR; Radio Resource Control (RRC) protocol specification" ("REF6"); 3GPP TS 38.300 Rel-16 v16.4.0, "NR; NR and NG-RAN Overall Description; Stage 2" ("REF7"); and 3GPP TS 38.133 Rel-16 v16.4.0, "NR; NR Requirements for support of radio resource management" ("REF8").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
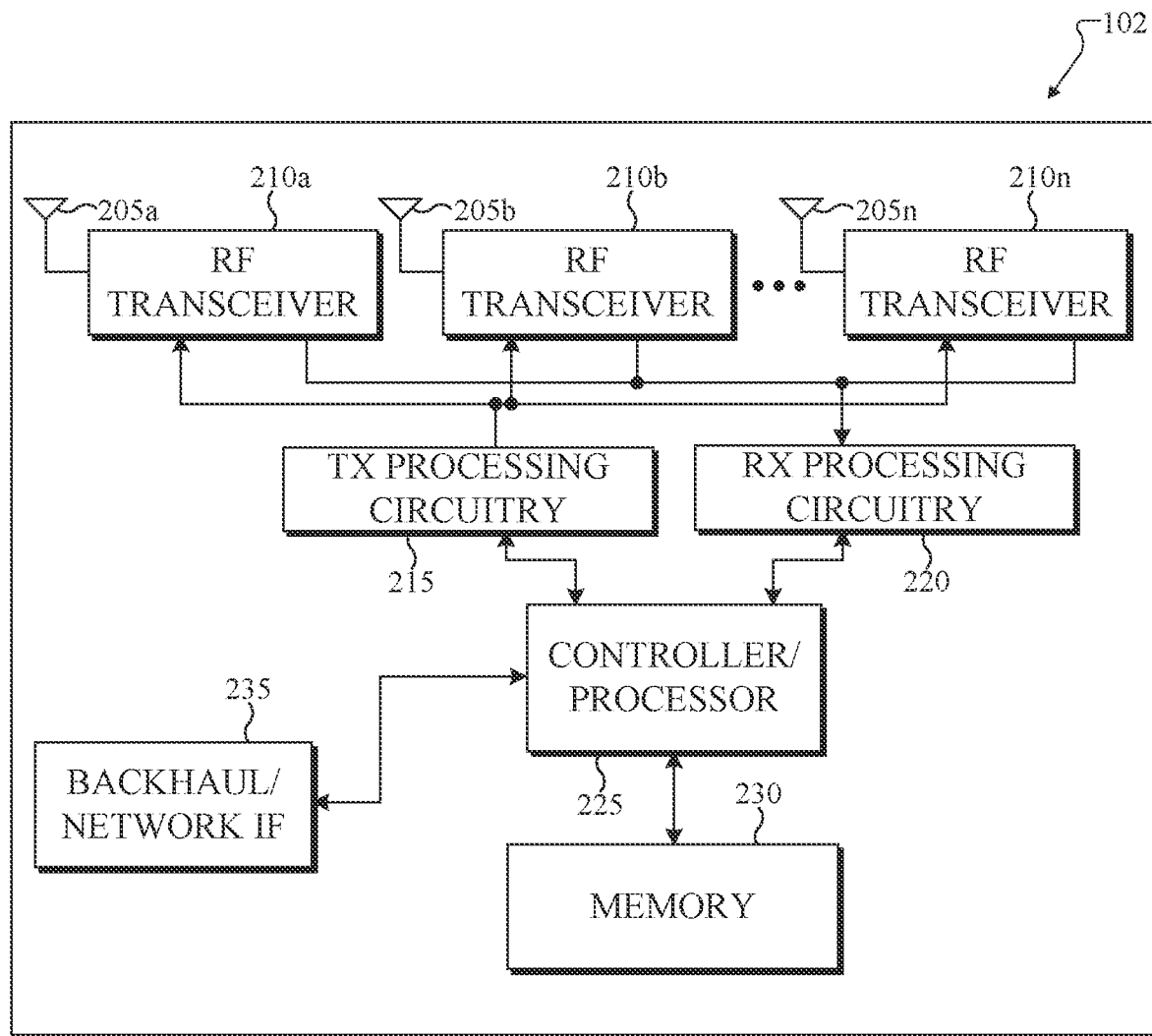
FIG. 2 illustrates an example BS according to embodiments of the present disclosure.
Figure 3:
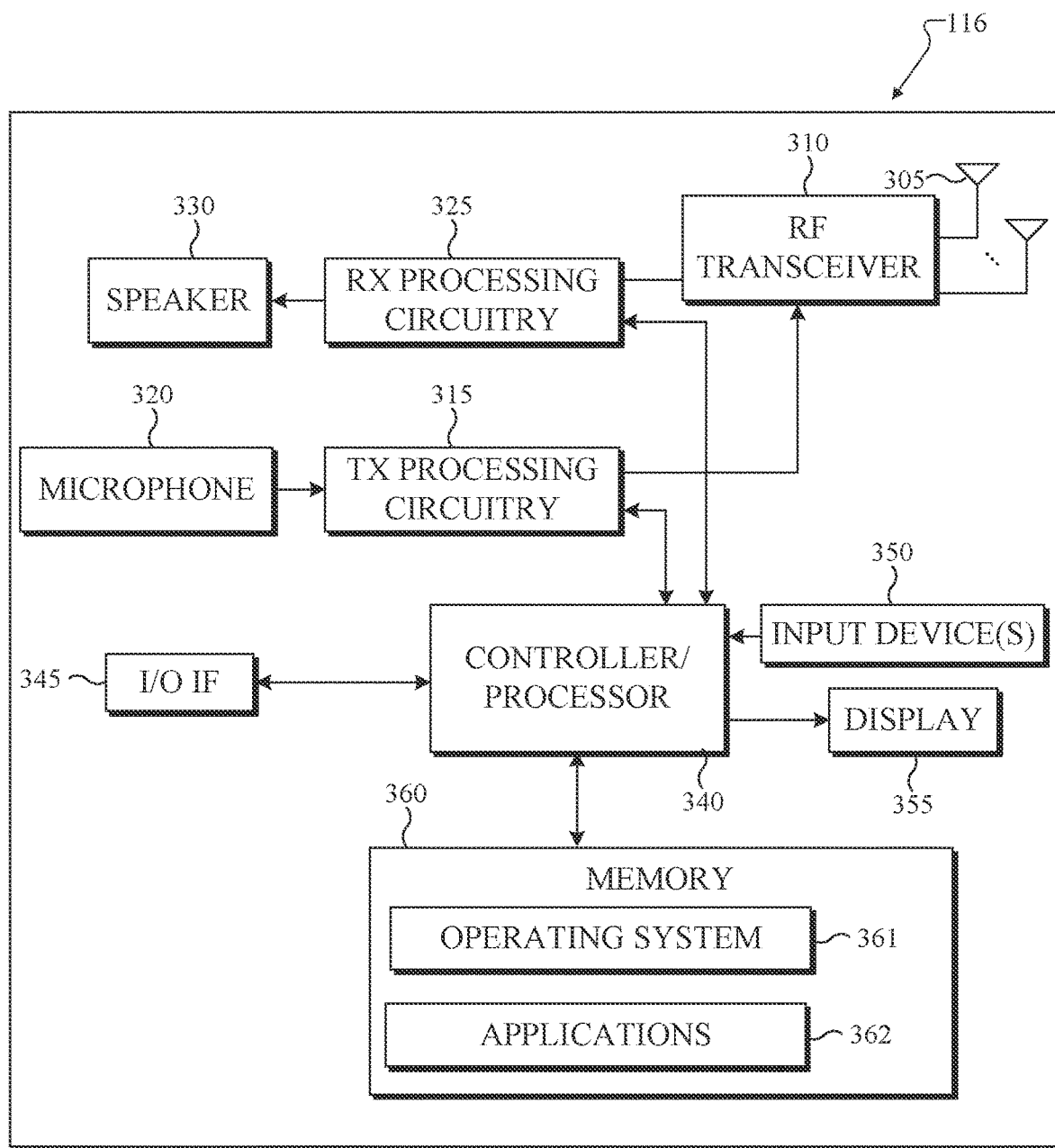
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It may be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for scheduling for dynamic spectrum sharing and cross-carrier scheduling enhancements. In certain embodiments, and one or more of the BSs 101-103 includes circuitry, programming, or a combination thereof for scheduling for dynamic spectrum sharing and cross-carrier scheduling enhancements.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling for dynamic spectrum sharing and cross-carrier scheduling enhancements. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
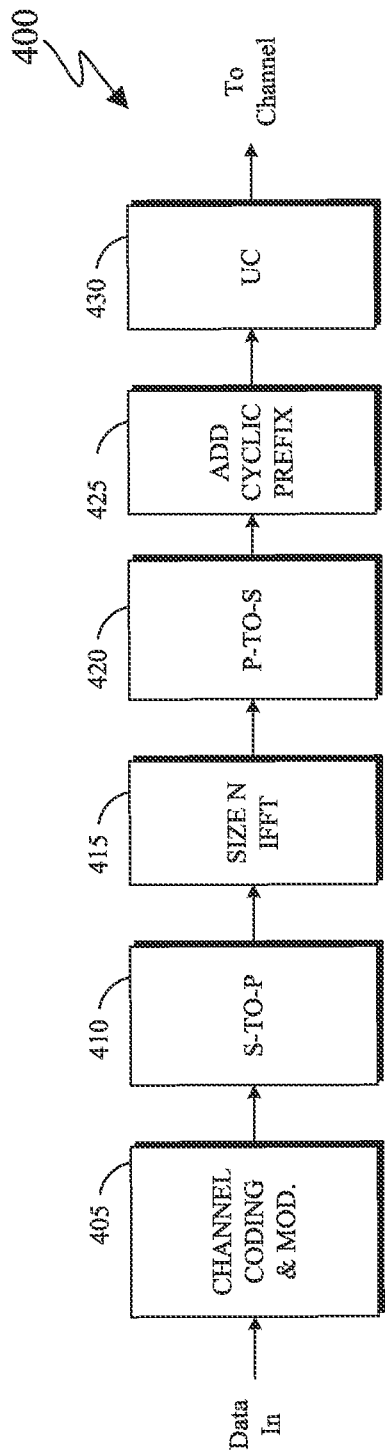
FIGS. 4 and 5 illustrate example wireless transmit and receive paths according to embodiments of the present disclosure.
Figure 5:
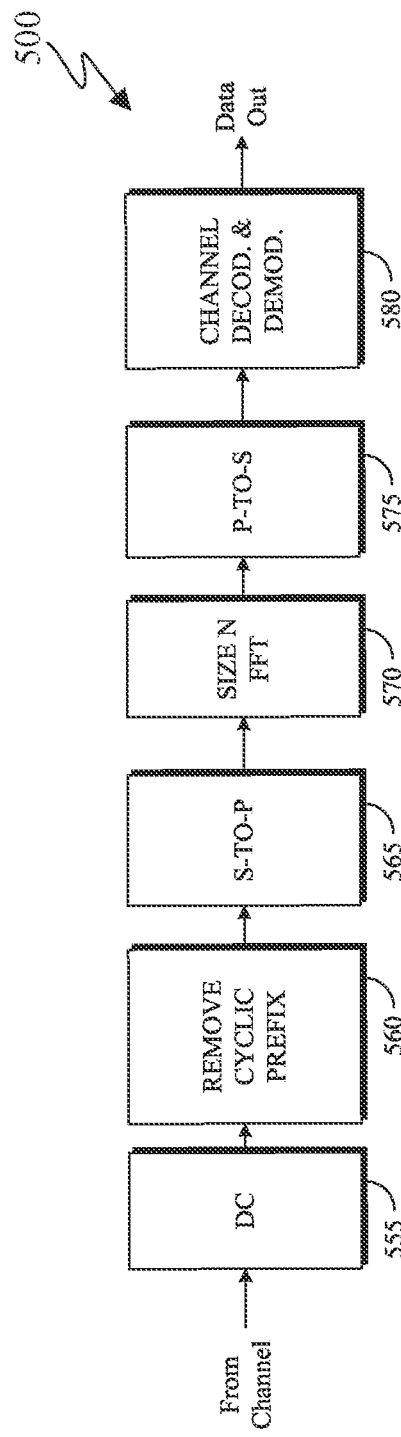

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support scheduling for dynamic spectrum sharing and cross-carrier scheduling enhancements as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure considers enhancements for cross-carrier scheduling to achieve fast, efficient, and flexible physical downlink control channel (PDCCH) monitoring. Cross-carrier scheduling is a key element in carrier aggregation (CA) operation to improve PDCCH capacity, coverage, or reliability and simplify PDCCH monitoring by a UE.

Cross-carrier scheduling (CCS) involves a single scheduling cell for each serving/scheduled cell as provided by higher layer configuration. However, for (i) dynamic usage of resources available for PDCCH transmissions on a scheduling cell, (ii) dynamic adaptation to offered scheduled traffic, or (iii) UE power savings, it is beneficial to consider scenarios wherein a scheduled cell can be scheduled by one or more from multiple scheduling cells. One such scenario is dynamic spectrum sharing (DSS) on a primary cell between different radio access technologies, such as LTE and NR, wherein the primary cell can be configured for both self-carrier scheduling and cross-carrier scheduling by a secondary cell (SCell) that is referred to as special SCell (sSCell).

It is noted that PDCCH monitoring for scheduling of a first number of scheduled cells from a second number of scheduling cells, and for obtaining control information that is not associated with scheduling, is according to a corresponding UE capability for PDCCH monitoring as described in REF5. A UE (such as the UE 116) has a capability for PDCCH monitoring, defined by a maximum number of PDCCH candidates the UE can decode and by a maximum number of CCEs the UE can obtain different channel estimates (non-overlapping CCEs), that is predetermined in the specifications of the system operation. The capability can be defined per slot or per combination (X, Y) where Y is a number of consecutive symbols within which a UE monitors PDCCH and is referred to as a span, and X is a number of symbols between first symbols of two consecutive spans.

A UE (such as the UE 116) can be configured to monitor PDCCH according to a number of common search space (CSS) sets and a number of UE-specific search space (USS) sets. In addition to PDCCH monitoring for scheduling unicast traffic according to USS, PDCCH monitoring for scheduling multicast-broadcast traffic according to CSS may be considered under the enhanced cross-carrier scheduling operation.

Various other restrictions also exist with the legacy operation of cross-carrier scheduling. For example, when a scheduling cell for a scheduled cell becomes deactivated or has an active downlink (DL) bandwidth part (BWP) change to a dormant DL BWP, there are no PDCCH transmissions on the scheduling cell and corresponding scheduled cells also effectively become deactivated or change an active DL BWP to a dormant DL BWP, or higher layer reconfiguration is required for the scheduled cells in order to establish PDCCH monitoring on new scheduling cells. In addition, higher layer configuration of search space sets on scheduling cells and corresponding linked search space sets on the scheduled cells, together with a requirement for search space sets to be on an active DL BWP, can limit an ability to change an active DL BWP on the scheduled cell.

Therefore, embodiments of the present disclosure take into consideration that there is a need to enable multiple scheduling cells for PDCCH monitoring according to CSS for scheduling multicast-broadcast traffic for a scheduled cell.

Embodiments of the present disclosure also take into consideration that there is another need to support a fast switching of a scheduling cell for a UE, such as when a current scheduling cell is deactivated or changes an active DL BWP to a dormant DL BWP, in order to avoid an RRC reconfiguration for a scheduling cell and for the UE to continue to receive/transmit on scheduled cells without interruption.

Embodiments of the present disclosure further take into consideration that there is a need to enable flexible configuration and linkage of search space sets on a scheduling cell with search space sets on a scheduled cell, so that a UE can benefit from a dynamic BWP change for both the scheduling cell(s) and the corresponding scheduled cell(s) without restrictions on PDCCH monitoring.

Accordingly, embodiments of the present disclosure describes methods and an apparatus for cross-carrier scheduling to enable fast, efficient, and flexible PDCCH monitoring in a CA framework. The embodiments of present disclosure also describe methods for scheduling of multicast-broadcast PDSCH receptions according to CSS sets on a primary cell or on a sSCell. The embodiments of present disclosure further describe mechanisms for fast replacement of scheduling cells by enabling new scheduling cells that replace scheduling cells that are deactivated, or change corresponding active DL BWPs to dormant DL BWPs, without a need for RRC reconfiguration of the scheduling cells. Additionally, the embodiments of present disclosure describe approaches for configuration of search space sets of a scheduled cell to be linked to search space sets on multiple DL BWPs of a corresponding scheduling cell.

One motivation for enhanced cross-carrier scheduling is reduced control signaling overhead or dynamic spectrum sharing for low frequency bands such as below 6 GHz (also referred to as FR1) in order to support coexistence of LTE and NR radio access technologies. In general, the embodiments apply to any CA deployments including for operation in frequency bands above 6 GHz, for sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), and the like.

Embodiments of this disclosure describe multicast and broadcast services (MBS) PDSCH scheduling for a scheduled cell from two scheduling cells This is described in the following examples and embodiments, such as those of FIG. 6, described below. When a UE (such as the UE 116) is configured for scheduling on a primary cell from two scheduling cells that include the primary cell and a sSCell, a PDCCH reception according to a CSS set that provides a downlink control information (DCI) format scheduling a unicast physical downlink shared channel (PDSCH) reception on the primary cell can only be on the primary cell. A PDCCH reception according to a CSS set that provides a DCI format scheduling an MBS PDSCH reception on the primary cell can be on the primary cell or on the sSCell. For example, the DCI format scheduling the MBS PDSCH reception can include a carrier indicator field (CIF) with a value indicating a cell for a corresponding MBS PDSCH reception, or an MBS PDSCH reception can be only on the primary cell or only on the sSCell, or a DCI format scheduling an MBS PDSCH reception on the primary cell can be associated with different indexes of search space sets or with different RNTIs for scrambling a cyclic redundancy check (CRC) of the DCI format than a DCI format scheduling an MBS PDSCH reception on the sSCell.

Embodiments of this disclosure describe fast replacement of a deactivated scheduling cell for corresponding scheduled cells. This is described in the following examples and embodiments, such as those of FIG. 7, described below. A UE (such as the UE 116) can be configured a set of scheduling cells for a scheduled cell. Herein only a subset of the set of scheduling cells is active at a time for the scheduled cell, so that when an active scheduling cell for the scheduled cell is deactivated (or changes an active DL BWP to a dormant BWP), the UE monitors PDCCH for the scheduled cell on another scheduling cell from the set of scheduling cells. For example, the UE monitors PDCCH on a scheduling cells with a smallest index that is not deactivated or has a non-dormant BWP as the active DL BWP, without a corresponding indication or a higher layer configuration by the gNB.

Embodiments of this disclosure describe cross-BWP configuration of search space sets for cross-carrier scheduling. This is described in the following examples and embodiments, such as those of FIG. 8, described below. When a UE (such as the UE 116) is configured with a first search space set on a first BWP of a scheduling cell and is also configured with a second search space set on a second BWP of the scheduling cell, the UE can be configured with a third search space set for a scheduled cell corresponding to the scheduling cell. In this example, the third search space set is linked with both the first search space set and the second search space set. In one realization, the third search space set has a same search space set index as the first search space set, but has a different search space set index than the second search space set.

As discussed above, a UE (such as the UE 116) can be configured to monitor PDCCH according to a number of CSS sets and a number of USS sets. As a gNB (such as the BS 102) can schedule many UEs in a slot, it is not practical for the gNB to configure search space sets to each UE so that a corresponding UE capability for PDCCH monitoring is not exceeded. This is particularly the case for a primary cell where a UE is scheduled most often and where a UE typically receives control information, as the primary cell typically provides large coverage and is not deactivated. For those reasons "PDCCH overbooking" is allowed on the primary cell; a configuration of search space sets can exceed the UE capability for PDCCH monitoring on the primary cell, and the UE needs to prioritize search space sets for PDCCH monitoring and drop PDCCH monitoring in search space sets of lower priority so that an allocation of PDCCH candidates and non-overlapping CCEs on the primary cell is not exceeded.

Although a UE procedure for dropping search space sets on a primary cell for satisfying a corresponding allocation of PDCCH candidates and non-overlapping CCEs is well defined when a scheduled cell has only one scheduling cell (for the primary cell the scheduling cell is the primary cell), a new UE procedure may be defined when a scheduled cell, such as the primary cell, has multiple scheduling cells.

Embodiments of the present discloser take into consideration that there is a need to specify a UE procedure for search space set dropping when a UE is configured with multiple scheduling cells for a scheduled cell, such as a primary cell.

Accordingly, various embodiments are disclosed for handling overbooking of PDCCH monitoring for a scheduled cell, such as a primary cell, when the scheduled cell is configured with multiple scheduling cells. Several approaches are described for counting PDCCH candidates and non-overlapping CCEs in a slot or span, including corresponding UE capability limits for monitored PDCCH candidates and for prioritization of search space sets among multiple scheduling cells for PDCCH monitoring and search space set dropping.

Embodiments of this disclosure describe a procedure for search space set dropping for a scheduled cell with multiple simultaneous/active scheduling cells. For example, when a UE (such as the UE 116) is indicated, either by a DCI format or other L1/L2 signaling or by a configuration from higher layers, to simultaneously monitor PDCCH for a serving cell on two or more scheduling cells, the UE can apply prioritization rules among search space sets on the two or more scheduling cells that overlap in a same slot. The search space sets can include one or more CSS sets, or one or more USS sets. The UE can drop PDCCH monitoring on some search space sets on one or multiple scheduling cell(s) based on prioritization rules when a number of PDCCH candidates or a number of non-overlapping CCEs in a slot or span exceed(s) corresponding limit(s). In the following, for brevity, such an event is referred to as PDCCH overbooking.

Embodiments of this disclosure describe a procedure for search space set dropping for a scheduled cell when counting PDCCH candidates or non-overlapping CCEs for the scheduled cell separately per scheduling cell from multiple scheduling cells. This is described in the following examples and embodiments, such as those of FIG. 9, described below. For example, a UE (such as the UE 116) can determine an overbooking event for a scheduled cell by individually determining an overbooking for the scheduled cell on a slot or span on any of the scheduling cells for the scheduled cell. Such an approach can be considered, for example, when the UE counts a number of PDCCH candidates or non-overlapping CCEs for a scheduled cell separately per scheduling cell.

Embodiments of this disclosure describe a procedure for search space set dropping for a scheduled cell when counting PDCCH candidates or non-overlapping CCEs for the scheduled cell jointly across all scheduling cells. This is described in the following examples and embodiments, such as those of FIGS. 10 and 11, described below. For example, a UE (such as the UE 116) can determine an overbooking event for a scheduled cell when the UE counts a number of PDCCH candidates or non-overlapping CCEs for a scheduled cell jointly across scheduling cells for the scheduled cell, and the counted number(s) exceed(s) a limit on the number of PDCCH candidates or non-overlapping CCEs for the scheduled cell.

Embodiments of this disclosure describe a procedure for search space set dropping when a UE monitors PDCCH on only one scheduling cell in a slot or span. This is described in the following examples and embodiments, such as those of FIG. 12, described below. For example, when a UE (such as the UE 116) is indicated search space sets, such as by higher layers, that result to PDCCH monitoring for a scheduled cell on at most one scheduling cell in any slot or span, the UE can apply a procedure for search space set dropping as when the scheduled cell has only one scheduling cell.

Embodiments of this disclosure describe a procedure for each space set dropping on a secondary cell that schedules a primary cell. For example, a UE (such as the UE 116) can be configured for scheduling on a cell, such as a primary cell, by both the primary cell and a sSCell. The UE can be configured PDCCH on the sSCell according to CSS sets, for example for Type-3 CSS or for a CSS used for scheduling multicast-broadcast PDSCH receptions on the primary cell and is referred for brevity as Type-4 CSS. The UE can determine a PDCCH overbooking event for the sSCell (as a scheduled/serving cell) based on CSS sets and/or USS sets configured on the sSCell. Accordingly, the UE can drop some search space sets on the sSCell according.

As used throughout the present disclosure, the term "configuration" or "higher layer configuration" and variations thereof (such as "configured" and so on) are used to refer to one or more of: a system information signaling such as by a master information block (MIB) or a system information block (SIB) (such as SIB1), a common or cell-specific higher layer/RRC signaling, or a dedicated or UE-specific or BWP-specific higher layer/RRC signaling, to prioritization rules.

Throughout the present disclosure, the term signal quality is used to refer to e.g. reference signal received power (RSRP), reference signal received quality (RSRQ), received signal strength indicator (RSSI), signal-to-noise ratio (SNR), or signal-to-noise and interference ratio (SINR), with or without filtering such as L1 or L3 filtering, of a channel or a signal such as a reference signal (RS) including synchronization signal (SS) physical broadcast channel (PBCH) block, channel state information (CSI)-RS, or sounding reference signal (SRS).

Throughout this disclosure, the term dynamic physical uplink shared channel (PUSCH) transmission is used to refer to a PUSCH transmission that is scheduled by a DCI format.

The term Xn interface refers to a network interface between NG-RAN nodes. F1 interface refers to a network interface between a gNB central unit (CU) and a gNB distributed unite (DU).

An antenna port is defined such that the channel over which a symbol on the antenna port is conveyed can be inferred from the channel over which another symbol on the same antenna port is conveyed.

For demodulation reference signal (DM)-RS (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block (SSB) transmitted within the same slot, and with the same block index.

Two antenna ports can be considered to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DM-RS ports associated with a PDSCH are QCL with QCL Type A, Type D (when applicable) and average gain. The UE may further assume that no DM-RS collides with the SS/PB CH block.

In certain embodiments, a UE (such as the UE 116) can be configured with a list of up to M transmission configuration indication (TCI)-State configurations within the higher layer parameter PDSCH-Config to decode PDSCH according to a detected PDCCH with DCI intended for the UE and the given serving cell. Here M depends on the UE capability maxNumberConfiguredTCIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one value: A first value denoted as 'QCL-TypeA' corresponds to {Doppler shift, Doppler spread, average delay, delay spread}. A second value denoted as 'QCL-TypeB' corresponds to {Doppler shift, Doppler spread}. A third value denoted as 'QCL-TypeC' corresponds to {Doppler shift, average delay}. A fourth value denoted as 'QCL-TypeD' corresponds to {Spatial Rx parameter}.

The UE can receive a MAC control element (MAC-CE) activation command to map up to N (e.g., N=8 TCI states to the codepoints of the DCI field 'Transmission Configuration Indication'). When the hybrid automatic repeat request (HARQ) acknowledgement (ACK) information corresponding to the PDSCH carrying the MAC-CE activation command is transmitted in slot n, the indicated mapping between TCI states and codepoints of the DCI field 'Transmission Configuration Indication' may be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

A gNB (such as the BS 102) can transmit multiple SSBs within a cell bandwidth or within the frequency span of a carrier. The PCIs of SSBs transmitted in different frequency locations can have different PCIs. When an SSB is associated with a SIB such as an RMSI, the SSB is referred to as a Cell-Defining SSB (CD-SSB). A primary cell (PCell) is associated to a CD-SSB located on the synchronization raster. From a UE perspective, each serving cell is associated with at most a single SSB.

For a UE (such as the UE 116) in RRC_CONNECTED state, the BWPs configured to the UE by a serving cell may overlap in frequency with BWPs configured to other UEs by other cells within a carrier.

CORESET #0 refers to a control resource set used for PDCCH transmission for at least SIB1 scheduling. CORESET #0 can be configured either by the MIB or by UE-dedicated RRC signaling.

It is noted that system Information (SI) includes an MIB and a number of SIB s.

A minimum SI includes information required for initial access and information for acquiring any other SI. Minimum SI consists of MIB and a first SIB (SIB1). Here, MIB contains cell barred status information and essential physical layer information of the cell required to receive further system information (e.g. CORESET #0 configuration. MIB is periodically broadcast on BCH). Additionally, SIB1 defines the scheduling of other system information blocks and contains information required for initial access. SIB1 is also referred to as Remaining Minimum SI (RMSI) and is periodically broadcasted on DL-SCH or transmitted in a UE-dedicated manner on DL-SCH to a UE in RRC_CONNECTED state.

Other SIB s can either be periodically broadcasted on DL-SCH, broadcasted on-demand on DL-SCH (i.e. upon request from UEs in RRC_IDLE, RRC_INACTIVE, or RRC_CONNECTED), or provided in a dedicated manner on DL-SCH to a UE in RRC_CONNECTED state (i.e., upon request, if configured by the network, from UEs in RRC_CONNECTED or when the UE has an active BWP with no common search space configured).

For a cell/frequency that is considered for camping by the UE, the UE is not required to acquire the contents of MIB/SIB1 of that cell/frequency from another cell/frequency layer. This does not preclude the case that the UE applies stored SI from previously visited cell(s).

If the UE cannot determine the full contents of the MIB/SIB1 of a cell by receiving from that cell, the UE shall consider that cell as barred.

In case of bandwidth adaptation and BWP operation, the UE only acquires SI on the active BWP. An initial BWP can be for example 24, 48, or 96 RBs in the frequency domain.

The MIB is mapped on the broadcast control channel (BCCH) and carried on BCH while all other SI messages are mapped on the BCCH, where they are dynamically carried on Downlink-shared channel (DL-SCH).

For a UE to be allowed to camp on a cell, the UE needs to have acquired the MIB/SIB1 from that cell. There may be cells in the system that do not broadcast MIB/SIB1 and therefore a UE cannot camp on such cells.

It is noted that, dual active protocol stack (DAPS) handover refers to a handover procedure that maintains the source gNB connection after reception of RRC message for handover and until releasing the source cell after successful random access to the target gNB.

A MAC entity is defined per cell group, one for the master cell group (MCG) and one for the secondary cell group (SCG). Two MAC entities can be considered for a UE when the UE is configured with DAPS handover: one for the source cell (source MAC entity) and one for the target cell (target MAC entity).

Also, CA is a framework for wider bandwidth operation, wherein the UE can transmit and/or receive on multiple carriers/cells, referred to as component carriers (CCs), in parallel. A CA operation can involve intra-band contiguous or non-contiguous CCs, as well as inter-band CCs, for frequency placements of CCs. A CA operation can be visible to PHY and MAC layers (L1 and L2), but transparent to higher layers.

In CA, two or more CCs are aggregated. A UE may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one timing advance group (TAG)). For another example, a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell. For yet another example, a non-CA capable UE can receive on a single CC and transmit on a single CC corresponding to one serving cell only (one serving cell in one TAG).

For CA operation, frame timing and system frame number (SFN) are aligned across cells that can be aggregated, or an offset in multiples of slots between the PCell/primary secondary cell (PSCell) and a secondary cell (SCell) is configured to the UE. For example, the maximum number of configured CCs for a UE is 16 for DL and 16 for uplink (UL).

In conjunction with a UL/DL carrier pair (frequency division duplex (FDD) band) or a bidirectional carrier (time division duplex (TDD) band), a UE may be configured with additional, Supplementary Uplink (SUL). SUL differs from the aggregated uplink in that the UE may be scheduled to transmit either on the supplementary uplink or on the uplink of the carrier being supplemented, but not on both at the same time.

When CA is configured, the UE only has one RRC connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore includes one PCell and one or more SCells.

The reconfiguration, addition, and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e., while in connected mode, UEs need not acquire broadcast system information directly from the SCells.

To enable bandwidth adaptation (BS) on the PCell, the gNB (such as the BS 102) configures the UE (such as the UE 116) with UL and DL BWP(s). To enable BA on SCells in case of CA, the gNB configures the UE with DL BWP(s) at least (i.e., there may be none in the UL). For the PCell, the BWP used for initial access is configured via system information. For the SCell(s), the BWP used after initial activation is configured via dedicated RRC signaling.

In paired spectrum, DL and UL can switch BWP independently. In unpaired spectrum, DL and UL switch BWP simultaneously. Switching between configured BWPs happens by means of RRC signaling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

In certain embodiments, to enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while physical uplink control channel (PUCCH) SCell (a Secondary Cell configured with PUCCH) is deactivated, SCells of secondary PUCCH group (a group of SCells whose PUCCH signaling is associated with the PUCCH on the PUCCH SCell) may not be activated. NG-RAN ensures that SCells mapped to PUCCH SCell are deactivated before the PUCCH SCell is changed or removed.

When reconfiguring the set of serving cells SCells added to the set are initially activated or deactivated; and SCells which remain in the set (either unchanged or reconfigured) do not change their activation status (activated or deactivated).

At handover or connection resume from RRC_INACTIVE, SCells are activated or deactivated.

In certain embodiments, to enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random access channel (PRACH) and UL-SCH.

In certain embodiments, to enable fast SCell activation when CA is configured, one dormant BWP can be configured for an SCell. If the active BWP of the activated SCell is a dormant BWP, the UE stops monitoring PDCCH on the SCell but continues performing CSI measurements, AGC and beam management, if configured. A DCI is used to control entering/leaving the dormant BWP for one or more SCell(s) or one or more SCell group(s).

It is noted that the dormant BWP is one of the UE's dedicated BWPs configured by network via dedicated RRC signaling. The SpCell and PUCCH SCell cannot be configured with a dormant BWP.

Cross-carrier scheduling with the CIF allows the PDCCH of a serving cell to schedule resources (e.g., for data transmission and/or reception) on another serving cell but with the following restrictions in the current standards. An example restriction can include, cross-carrier scheduling may not apply to PCell i.e. PCell may be scheduled via its PDCCH. In some examples, PCell can be also cross-scheduled by an SCell. For another example restriction, when an SCell is configured with a PDCCH, that cell's PDSCH and PUSCH are scheduled by the PDCCH on this SCell. For another example restriction, when an SCell is not configured with a PDCCH, that SCell's PDSCH and PUSCH are scheduled by a PDCCH on another serving cell. For yet another example restriction, the scheduling PDCCH and the scheduled PDSCH/PUSCH can use the same or different numerologies.

Cross-carrier scheduling allows for PDCCH monitoring and/or reception on a few serving cells, referred to as the scheduling cells, while the received PDCCHs correspond to scheduling data transmission and/or reception, etc. on all serving cells, referred to as the scheduled cells.

The PDCCH can be used to schedule DL transmissions on PDSCH and UL transmissions on PUSCH. For example, the DCI on PDCCH can include includes (i) downlink assignments containing at least modulation and coding format, resource allocation, and hybrid-ARQ information related to DL-SCH; and (ii) uplink scheduling grants containing at least modulation and coding format, resource allocation, and hybrid-ARQ information related to UL-SCH.

In addition to scheduling, PDCCH can be used for any one of the following: (i) Activation and deactivation of configured PUSCH transmission with configured grant; (ii) activation and deactivation of PDSCH semi-persistent transmission; (iii) notifying one or more UEs of the slot format; (iv) notifying one or more UEs of the PRB(s) and OFDM symbol(s) where the UE may assume no transmission is intended for the UE; (v) transmission of transmit power control (TPC) commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; and (x) in integrated access backhaul (IAB) context, indicating the availability for soft symbols of an IAB-DU.

In certain embodiments, a UE (such as the UE 116) monitors a set of PDCCH candidates in the configured monitoring occasions in one or more configured COntrol REsource SETs (CORESETs) according to the corresponding search space configurations.

A CORESET consists of a set of PRBs with a time duration of one to three OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

It is noted that polar coding can be used for PDCCH. Each resource element group carrying PDCCH carries its own DM-RS. QPSK modulation is used for PDCCH.

A UE can monitor a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

If a UE is provided monitoringCapabilityConfig-r16 for a serving cell, the UE obtains an indication to monitor PDCCH on the serving cell for a maximum number of PDCCH candidates and non-overlapping CCEs (i) per slot, if monitoringCapabilityConfig-r16=r15monitoringcapability, or (ii) per span, if monitoringCapabilityConfig-r16=r16monitoringcapability.

If the UE is not provided monitoringCapabilityConfig-r16, the UE monitors PDCCH on the serving cell per slot.

A UE can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE monitors PDCCH on the cell according to the combination (X, Y), from the one or more combinations (X, Y), that is associated with the largest maximum number of $C_{PDCCH}^{max,(X,Y),\mu}$ and $M_{PDCCH}^{max,(X,Y),\mu}$ defined in Table 10.1-2A and Table 10.1-3A.

A UE capability for PDCCH monitoring per slot or per span on an active DL BWP of a serving cell is defined by a maximum number of PDCCH candidates and non-overlapped CCEs the UE can monitor per slot or per span, respectively, on the active DL BWP of the serving cell.

If a UE indicates in UE-NR-Capability a carrier aggregation capability larger than four serving cells, the UE includes in UE-NR-Capability an indication for a maximum number of PDCCH candidates the UE can monitor per slot when the UE is configured for carrier aggregation operation over more than four cells. When a UE is not configured for NR-DC operation, the UE determines a capability to monitor a maximum number of PDCCH candidates per slot that corresponds to $N_{cells}^{cap}$, downlink cells. In this example, $N_{cells}^{cap}$ is the number of configured downlink cells if the UE does not provide pdcch-BlindDetectionCA, otherwise, $N_{cells}^{cap}$ is the value of pdcch-BlindDetectionCA.

If a UE indicates in UE-NR-Capability a carrier aggregation capability larger than 4 serving cells and the UE is not provided monitoringCapabilityConfig-r16 for any downlink cell or if the UE is provided monitoringCapabilityConfig-r16=r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells. In this example, $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ the number of configured downlink serving cells; otherwise, $N_{cells}^{cap}$ is the value of pdcch-BlindDetectionCA.

For each DL BWP configured to a UE in a serving cell, the UE can be provided by higher layer signaling with P≤3 CORESETs if CORESETPoolIndex is not provided, or if a value of CORESETPoolIndex is same for all CORESETs if CORESETPoolIndex is provided. Alternatively, the UE can be provided by higher layer signaling with P≤5 CORESETs if CORESETPoolIndex is not provided for a first CORESET, or is provided and has a value 0 for a first CORESET, and is provided and has a value 1 for a second CORESET.

For each CORESET, the UE is provided various parameters by ControlResourceSet. An example parameter includes a CORESET index p, by controlResourceSetId. Here, if 0≤p<12 and if CORESETPoolIndex is not provided, or if a value of CORESETPoolIndex is same for all CORESETs if CORESETPoolIndex is provided. Alternatively, if 0<p<16 if CORESETPoolIndex is not provided for a first CORESET, or is provided and has a value 0 for a first CORESET, and is provided and has a value 1 for a second CORESET. For another example the parameter includes a DM-RS scrambling sequence initialization value by pdcch-DMRS-ScramblingID. For another example the parameter includes a precoder granularity for a number of REGs in the frequency domain where the UE can assume use of a same DM-RS precoder by precoderGranularity. For another example the parameter includes a number of consecutive symbols provided by duration. For another example the parameter includes a set of resource blocks provided by frequencyDomainResources. For another example the parameter includes CCE-to-REG mapping parameters provided by cce-REG-MappingType. For another example the parameter includes an antenna port quasi co-location, from a set of antenna port quasi co-locations provided by TCI-State, indicating quasi co-location information of the DM-RS antenna port for PDCCH reception in a respective CORESET. Here, if the UE is provided by simultaneousTCI-UpdateList-r16 or simultaneous TCI-UpdateList-Second-r16 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command. For yet another example the parameter includes an indication for a presence or absence of a transmission configuration indication (TCI) field for a DCI format, other than DCI format 1_0, that schedules PDSCH receptions or indicates semi-persistent scheduling (SPS) PDSCH release and is transmitted by a PDCCH in CORESET p, by tci-PresentInDCI or tci-PresentInDCI-ForDCIFormat1_2.

In certain embodiments, when precoderGranularity=allContiguousRBs, a UE does not expect (i) to be configured a set of resource blocks of a CORESET that includes more than four sub-sets of resource blocks that are not contiguous in frequency, (ii) any RE of a CORESET to overlap with any RE determined from lte-CRS-ToMatchAround, or from LTE-CRS-PatternList-r16, or with any RE of a SS/PBCH block, or (iii) both.

For each CORESET in a DL BWP of a serving cell, a respective frequencyDomainResources provides a bitmap. For example, if a CORESET is not associated with any search space set configured with freqMonitorLocation-r16, the bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$ where the first common RB of the first group of 6 PRBs has common RB index $6 \cdot \lceil N_{BWP}^{start}/6 \rceil$ if rb-Offset-r16 is not provided, or the first common RB of the first group of 6 PRBs has common RB index $N_{BWP}^{start}+N_{RB}^{offset}$ where $N_{RB}^{offset}$ is provided by rb-Offset-r16. For another example, if a CORESET is associated with at least one search space set configured with freqMonitorLocation-r16, the first $N_{RBG,set0}^{size}$ bits of the bitmap have a one-to-one mapping with non-overlapping groups of 6 consecutive PRBs, in ascending order of the PRB index in each RB set k in the DL BWP bandwidth of $N_{RB}^{BWP}$ PRBs with starting common RB position $RB_{s0+k,DL}^{start,\mu}$ [REF4]. Here the first common RB of the first group of six PRB s has common RB index $RB_{s0+k,DL}^{start,\mu}+N_{RB}^{offset}$ and k is indicated by freqMonitoringLocations-r16 if provided for a search space set; otherwise, k=0. $N_{RB,set0}^{size}$ is a number of available PRBs in the RB set 0 for the DL BWP, a described in Equation (1), below, $N_{RB}^{offset}$ is provided by rb-Offset-r16 or $N_{RB}^{offset}=0$ if rb-Offset-r16 is not provided.

$$N_{RBG,set0}^{size}=\lfloor(N_{RB,set0}^{size}-N_{RB}^{offset})/6\rfloor \qquad (1)$$

For a CORESET other than a CORESET with index 0, one of the following two approaches can be performed. In a first approach, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [REF5], the UE assumes that the DM-RS antenna port associated with PDCCH receptions is quasi co-located with the SS/PBCH block the UE identified during the initial access procedure. In another approach, if a UE has been provided a configuration of more than one TCI states by tci-StatesPDCCH-ToAddList and tci-StatesPDCCH-ToReleaseList for the CORESET as part of Reconfiguration with sync procedure as described in [REF6] but has not received a MAC CE activation command for one of the TCI states as described in [REF5], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [REF6].

For a CORESET with index 0, the UE assumes that a DM-RS antenna port for PDCCH receptions in the CORESET is quasi co-located with (i) the one or more DL RS configured by a TCI state, where the TCI state is indicated by a MAC CE activation command for the CORESET, if any, or (ii) a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that QCL-TypeD of a CSI-RS in a TCI state indicated by a MAC CE activation command for the CORESET is provided by a SS/PBCH block. In this example, if the UE receives a MAC CE activation command for one of the TCI states, the UE applies the activation command in the first slot that is after slot $k+3 \cdot N_{slot}^{subframe,\mu}$ where k is the slot where the UE would transmit a PUCCH with HARQ-ACK information for the PDSCH providing the activation command and $\mu$ is the SCS configuration for the PUCCH. The active BWP is defined as the active BWP in the slot when the activation command is applied.

For each DL BWP configured to a UE in a serving cell, the UE is provided by higher layers with S≤10 search space sets where, for each search space set from the S search space sets, the UE is provided the following parameters by SearchSpace. A parameter can include For example the parameter includes a search space set index s, 0≤s<40, by searchSpaceId. For another example the parameter includes an association between the search space set s and a CORESET p by controlResourceSetId. For another example the parameter includes a PDCCH monitoring periodicity of $k_s$ slots and a PDCCH monitoring offset of $o_s$ slots, by monitoringSlotPeriodicityAndOffset. For another example the parameter includes a PDCCH monitoring pattern within a slot, indicating first symbol(s) of the CORESET within a slot for PDCCH monitoring, by monitoringSymbolsWithinSlot. For another example the parameter includes a duration of $T_s < k_s$ slots indicating a number of slots that the search space set s exists by duration. For another example the parameter includes a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively. For another example the parameter includes an indication that search space set s is either a CSS set, or a USS set by searchSpaceType.

For another example, if search space set s is a CSS set, the parameter includes one or more indications including: (i) an indication by dci-Format0-0-AndFormat1-0 to monitor PDCCH candidates for DCI format 0_0 and DCI format 1_0; (ii) an indication by dci-Format2-0 to monitor one or two PDCCH candidates, or to monitor one PDCCH candidate per RB set if the UE is provided freqMonitorLocation-r16 for the search space set, for DCI format 2_0 and a corresponding CCE aggregation level; (iii) an indication by dci-Format2-1 to monitor PDCCH candidates for DCI format 2_1; (iv) an indication by dci-Format2-2 to monitor PDCCH candidates for DCI format 2_2; (v) an indication by dci-Format2-3 to monitor PDCCH candidates for DCI format 2_3; (vi) an indication by dci-Format2-4 to monitor PDCCH candidates for DCI format 2_4; and (vii) an indication by dci-Format2-6 to monitor PDCCH candidates for DCI format 2_6.

For another example, if search space set s is a USS set, the parameter includes an indication by dci-Formats to monitor PDCCH candidates either for DCI format 0_0 and DCI format 1_0, or for DCI format 0_1 and DCI format 1_1, or an indication by dci-Formats-Rel16 to monitor PDCCH candidates for DCI format 0_0 and DCI format 1_0, or for DCI format 0_1 and DCI format 1_1, or for DCI format 0_2 and DCI format 1_2, or, if a UE indicates a corresponding capability, for DCI format 0_1, DCI format 1_1, DCI format 0_2, and DCI format 1_2, or for DCI format 3_0, or for DCI format 3_1, or for DCI format 3_0 and DCI format 3_1.

For yet another example the parameter includes a bitmap by freqMonitorLocation-r16, if provided, to indicate an index of one or more RB sets for the search space set s, where the MBS k in the bitmap corresponds to RB set k−1 in the DL BWP. For RB set k indicated in the bitmap, the first PRB of the frequency domain monitoring location confined within the RB set is given by $RB_{s0+k,DL}^{start,\mu} + N_{RB}^{offset}$, where $RB_{s0+k,DL}^{start,\mu}$ is the index of first common RB of the RB set k [REF4], and $N_{RB}^{offset}$ is provided by rb-Offset-r16 or $N_{RB}^{offset}=0$ if rb-Offset-r16 is not provided. For each RB set with a corresponding value of 1 in the bitmap, the frequency domain resource allocation pattern for the monitoring location is determined based on the first $N_{RGB,set\ 0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In certain embodiments, a UE does not expect to be provided a first symbol and a number of consecutive symbols for a CORESET that results to a PDCCH candidate mapping to symbols of different slots.

In certain embodiments, a UE may does not expect any two PDCCH monitoring occasions on an active DL BWP, for a same search space set or for different search space sets, in a same CORESET to be separated by a non-zero number of symbols that is smaller than the CORESET duration.

A UE can determine a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ REF1 in a frame with number $n_f$ if $(n_f \cdot N_{slot}^{frame,\mu} + n_{s,f}^{\mu} - o_s) \bmod k_s = 0$. The UE monitors PDCCH candidates for search space set s for $T_s$ consecutive slots, starting from slot $n_{s,f}^{\mu}$, and does not monitor PDCCH candidates for search space set s for the next $k_s - T_s$ consecutive slots.

A USS at CCE aggregation level L∈{1, 2, 4, 8, 16} is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in a USS, if the UE is not configured with a carrier indicator field, the UE monitors the PDCCH candidates without carrier indicator field. For an active DL BWP of a serving cell on which a UE monitors PDCCH candidates in a USS, if a UE is configured with a carrier indicator field, the UE monitors the PDCCH candidates with carrier indicator field.

In certain embodiments, a UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are described in Equation (2), below.

$$L \cdot \left\{ \left( Y_{p,n_{s,f}^{\mu}} + \left\lfloor \frac{n_{s,n_{CI}} \cdot N_{CCE,p}}{L \cdot M_{s,max}^{(L)}} \right\rfloor + n_{CI} \right) \mod \lfloor N_{CCE,p} / L \rfloor \right\} + i \quad (2)$$

It is noted that, in Equation (2), for any CSS, $Y_{p,n_{s,f}^{\mu}}=0$. Also, in Equation (2), for a USS, $Y_{p,n_{s,f}^{\mu}}=(A_p \cdot Y_{p,n_{s,f}^{\mu}-1}) \mod D$, $Y_{p,-1}=n_{RNTI}\neq 0$, $A_p=39827$ for pmod3=0, $A_p=39829$ for pmod3=1, $A_p=39839$ for pmod3=2, and D=65537. Additionally, in Equation (2), i=0, . . . , L−1. The expression $N_{CCE,p}$, of Equation (2), is the number of CCEs, numbered from 0 to $N_{CCE,p}-1$, in CORESET p and, if any, per RB set. The expression, $n_{CI}$, of Equation (2) is the carrier indicator field value if the UE is configured with a carrier indicator field by CrossCarrierSchedulingConfig for the serving cell on which PDCCH is monitored, otherwise, including for any CSS, $n_{CI}=0$. In Equation (2), $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)}=M_{s,0}^{(L)}$. For a USS $M_{s,max}^{(L)}$ is the maximum of $M_{s,n_{CI}}^{(L)}$ over all configured $n_{CI}$ values for a CCE aggregation level L of search space set s. In Equation (2), the RNTI value used for $n_{RNTI}$ is the cell-RNTI (C-RNTI).

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

A PDCCH candidate with index $m_{s_j,n_{CI}}$ for a search space set $S_j$ using a set of CCEs in a CORESET p on the active DL BWP for serving cell $n_{CI}$ is not counted for monitoring if there is a PDCCH candidate with index $m_{s_i,n_{CI}}$ for a search space set $S_i < S_j$, or if there is a PDCCH candidate with index $n_{s_j,n_{CI}}$ and $n_{s_j,n_{CI}} < m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

Table 10.1-2 from [REF3] (reproduced below and denoted as Table (1)), provides the maximum number of monitored PDCCH candidates, $M_{PDCCH}^{max,slot,\mu}$, per slot for a UE in a DL BWP with SCS configuration μ for operation with a single serving cell. In particular, Table (1) describes maximum number $M_{PDCCH}^{max,slot,\mu}$ of monitored PDCCH candidates per slot for a DL BWP with SCS configuration $\mu \in \{0, 1, 2, 3\}$ for a single serving cell.

TABLE 1

| μ | Maximum number of monitored PDCCH candidates per slot and per serving cell $M_{PDCCH}^{max,\,slot,\,\mu}$ |
|---|---|
| 0 | 44 |
| 1 | 36 |
| 2 | 22 |
| 3 | 20 |

Table 10.1-2A from [REF3] (reproduced below and denoted as Table (2)), provides the maximum number of monitored PDCCH candidates, $M_{PDCCH}^{max,(X,Y),\mu}$, per span for a UE in a DL BWP with SCS configuration μ for operation with a single serving cell. In particular, Table (2) describes maximum number $M_{PDCCH}^{max,(X,Y),\mu}$ of monitored PDCCH candidates in a span for combination (X, Y) for a DL BWP with SCS configuration $\mu \in \{0, 1\}$ for a single serving cell.

TABLE 2

| μ | Maximum number $M_{PDCCH}^{max,\,(X,\,Y),\,\mu}$ of monitored PDCCH candidates per span for combination (X, Y) and per serving cell | | |
|---|---|---|---|
|   | (2, 2) | (4, 3) | (7, 3) |
| 0 | 14 | 28 | 44 |
| 1 | 12 | 24 | 36 |

Table 10.1-3 from [REF3] (reproduced below and denoted as Table (3)), provides the maximum number of non-overlapped CCEs, $C_{PDCCH}^{max,slot,\mu}$, for a DL BWP with SCS configuration μ that a UE is expected to monitor corresponding PDCCH candidates per slot for operation with a single serving cell. Here, CCEs for PDCCH candidates are non-overlapped if they correspond to: (i) different CORESET indexes, or (ii) different first symbols for the reception of the respective PDCCH candidates. In particular, Table (3) describes maximum number $C_{PDCCH}^{max,slot,\mu}$ of non-overlapped CCEs per slot for a DL BWP with SCS configuration $\mu \in \{0, 1, 2, 3\}$ for a single serving cell.

TABLE 3

| μ | Maximum number of non-overlapped CCEs per slot and per serving cell $C_{PDCCH}^{max,\,slot,\,\mu}$ |
|---|---|
| 0 | 56 |
| 1 | 56 |
| 2 | 48 |
| 3 | 32 |

Table 10.1-3A from [REF3] (reproduced below and denoted as Table (4)), provides the maximum number of non-overlapped CCEs, $C_{PDCCH}^{max,(X,Y),\mu}$, for a DL BWP with SCS configuration μ that a UE is expected to monitor corresponding PDCCH candidates per span for operation with a single serving cell. In particular, Table (4) describes maximum number $C_{PDCCH}^{max,(X,Y),\mu}$ of non-overlapped CCEs in a span for combination (X, Y) for a DL BWP with SCS configuration $\mu \in \{0, 1\}$ for a single serving cell.

TABLE 4

| | Maximum number $C_{PDCCH}^{max, (X, Y), \mu}$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

If a UE is configured with $N_{cells}^{DL,\mu}$ downlink cells with DL BWPs having SCS configuration μ where $$\sum_{\mu=0}^{3} N_{cells}^{DL,\mu} \leq N_{cells}^{cap},$$

the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration μ, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than PDCCH candidates (as described in Equation (3)) or more than non-overlapped CCEs per slot on the active DL BWP(s) of scheduling cell(s) from the $N_{cells}^{DL,\mu}$ downlink cells (as described in Equation (4)).

$$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor \quad (3)$$

$$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor \quad (4)$$

For each scheduled cell, the UE may not be required to monitor on the active DL BWP with SCS configuration μ of the scheduling cell more than $\min(M_{PDCCH}^{max,slot,\mu}, M_{PDCCH}^{total,slot,\mu})$ PDCCH candidates or more than min $(C^{max,slot,\mu}, C^{total,slot,\mu})$ non-overlapped CCEs per slot.

If a UE does not report pdcch-BlindDetectionCA or is not provided BDFactorR, then γ=R. Similarly, If a UE reports pdcch-BlindDetectionCA, then the UE can be indicated by BDFactorR either γ=1 or γ=R.

In certain embodiments, if a UE (such as the UE 116) is configured with $N_{cells,0}^{DL,\mu} + N_{cells,1}^{DL,\mu}$ downlink cells with associated PDCCH candidates monitored in the active DL BWPs of the scheduling cell(s) using SCS configuration μ where $\Sigma_{\mu=0}^{3}(N_{cells,0}^{DL,\mu} + \gamma \cdot N_{cells,1}^{DL,\mu}) \leq N_{cells}^{cap}$, then the UE is not required to monitor, on the active DL BWP of the scheduling cell, one of the following. That is, the UE is not required to monitor, on the active DL BWP of the scheduling cell more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell when the scheduling cell is from the $N_{cells,0}^{DL,\mu}$ downlink cells. The UE is also not required to monitor, on the active DL BWP of the scheduling cell more than $M_{PDCCH}^{total,slot,\mu} = \gamma \cdot M_{PDCCH}^{max,slot,\mu}$ PDCCH candidates or more than $C_{PDCCH}^{total,slot,\mu} = \gamma \cdot C_{PDCCH}^{max,slot,\mu}$ non-overlapped CCEs per slot for each scheduled cell when the scheduling cell is from the $N_{cells,1}^{DL,\mu}$ downlink cells. The UE is also not required to monitor, on the active DL BWP of the scheduling cell more than $M_{PDCCH}^{max,slot,\mu}$ PDCCH candidates or more than $C_{PDCCH}^{max,slot,\mu}$ non-overlapped CCEs per slot for CORESETs with same CORESETPoolIndex value for each scheduled cell when the scheduling cell is from the $N_{cells,1}^{DL,\mu}$ downlink cells.

If a UE (i) is configured with $N_{cells,0}^{DL,\mu} + N_{cells,1}^{DL,\mu}$ downlink cells for which the UE is not provided monitoringCapabilityConfig-r16 or is provided monitoringCapabilityConfig-r16=r15monitoringcapability, (ii) with associated PDCCH candidates monitored in the active DL BWPs of the scheduling cell(s) using SCS configuration μ, where $\Sigma_{\mu=0}^{3}(N_{cells,0}^{DL,\mu} + \gamma \cdot N_{cells,1}^{DL,\mu}) > N_{cells}^{cap}$, and (iii) a DL BWP of an activated cell is the active DL BWP of the activated cell, and a DL BWP of a deactivated cell is the DL BWP with index provided by firstActiveDownlinkBWP-Id for the deactivated cell, then the UE is not required to monitor more than PDCCH candidates as described in Equation (5) or more than non-overlapped CCEs per slot on the active DL BWP(s) of scheduling cell(s) from the $N_{cells,0}^{DL,\mu} + N_{cells,1}^{DL,\mu}$ downlink cells as described in Eq (6).

$$M_{PDCCH}^{total,slot,\mu} = \lfloor N_{cells}^{cap} \cdot M_{PDCCH}^{max,slot,\mu} \cdot (N_{cells,0}^{DL,\mu} + \gamma \cdot N_{cells,1}^{DL,\mu}) \Sigma_{j=0}^{3}(N_{cells,0}^{DL,j} + \gamma \cdot N_{cells,1}^{DL,j}) \rfloor \quad (5)$$

$$C_{PDCCH}^{total,slot,\mu} = \lfloor N_{cells}^{cap} \cdot C_{PDCCH}^{max,slot,\mu} \cdot (N_{cells,0}^{DL,\mu} + \gamma \cdot N_{cells,1}^{DL,\mu}) \Sigma_{j=0}^{3}(N_{cells,0}^{DL,j} + \gamma \cdot N_{cells,1}^{DL,j}) \rfloor \quad (6)$$

In certain embodiments, for each scheduled cell, the UE is not required to monitor on the active DL BWP with SCS configuration μ of the scheduling cell from the $N_{cells,0}^{DL,\mu}$ downlink cells more than $\min(M_{PDCCH}^{max,slot,\mu}, M_{PDCCH}^{total,slot,\mu})$ PDCCH candidates or more than min $(C_{PDCCH}^{max,slot,\mu}, C_{PDCCH}^{total,slot,\mu})$ non-overlapped CCEs per slot.

In certain embodiments, for each scheduled cell, the UE is not required to monitor on the active DL BWP with SCS configuration μ of the scheduling cell from the $N_{cells,1}^{DL,\mu}$ downlink cells more than $\min(\gamma \cdot M_{PDCCH}^{max,slot,\mu}, m_{PDCCH}^{total,slot,\mu})$ PDCCH candidates or more than min $(\gamma \cdot C_{PDCCH}^{max,slot,\mu}, C_{PDCCH}^{total,slot,\mu})$ non-overlapped CCEs per slot.

In certain embodiments, for each scheduled cell, the UE is not required to monitor on the active DL BWP with SCS configuration μ of the scheduling cell from the $N_{cells,1}^{DL,\mu}$ downlink cells more than $\min(M_{PDCCH}^{max,slot,\mu}, m_{PDCCH}^{total,slot,\mu})$ PDCCH candidates or more than min $(C_{PDCCH}^{max,slot,\mu}, C_{PDCCH}^{total,slot,\mu})$ CORESETPoolIndex value.

If a UE is configured only with $N_{cells,r16}^{DL,\mu}$ downlink cells for which the UE is provided monitoringCapabilityConfig-r16=r16monitoringcapability and with associated PDCCH candidates monitored in the active DL BWPs of the scheduling cell(s) using SCS configuration µ, and with $N_{cells,r16}^{DL,(X,Y),\mu}$ of the $N_{cells,r16}^{DL,\mu}$ downlink cells using combination (X, Y) for PDCCH monitoring, where $\Sigma_{\mu=0}^{1} N_{cells,r16}^{DL,\mu} > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu}$ PDCCH candidates (where $M_{PDCCH}^{total,(X,Y),\mu}$ is described in Equation (7)) or more than $C_{PDCCH}^{total,(X,Y),\mu}$ non-overlapped CCEs (where $C_{PDCCH}^{total,(X,Y),\mu}$ is described in Equation (8). It is noted that the UE is not required to monitor more than $C_{PDCCH}^{total,(X,Y),\mu}$ non-overlapped CCEs per set of spans on the active DL BWP(s) of all scheduling cell(s) from the $N_{cells,r16}^{DL,(X,Y),\mu}$ downlink cells, if the union of PDCCH monitoring occasions on all scheduling cells from the $N_{cells,r16}^{DL,(X,Y),\mu}$ downlink cells results to PDCCH monitoring according to the combination (X, Y) and any pair of spans in the set is within Y symbols, where first X symbols start at a first symbol with a PDCCH monitoring occasion and next X symbols start at a first symbol with a PDCCH monitoring occasion that is not included in the first X symbols. Similarly, the UE is not required to monitor more than $C_{PDCCH}^{total,(X,Y),\mu}$ non-overlapped CCEs per set of spans across the active DL BWP(s) of all scheduling cells from the $N_{cells,r16}^{DL,(X,Y),\mu}$ downlink cells, with at most one span per scheduling cell for each set of spans, otherwise where $N_{cells,r16}^{DL,j}$ is a number of configured cells with SCS configuration j. If a UE is configured with downlink cells for which the UE is provided both monitoringCapabilityConfig-r16=r15monitoringcapability and monitoringCapabilityConfig-r16=r16monitoringcapability, $N_{cells}^{cap-r16}$ is replaced by $N_{cells,r16}^{cap-r16}$.

$$M_{PDCCH}^{total,(X,Y),\mu} = \lfloor N_{cells}^{cap-r16} \cdot M_{PDCCH}^{max,(X,Y),\mu} \cdot N_{cells,r16}^{DL,(X,Y),\mu} / \Sigma_{j=0}^{1} N_{cells,r16}^{DL,j} \rfloor \quad (7)$$

$$C_{PDCCH}^{total,(X,Y),\mu} = \lfloor N_{cells}^{cap-r16} \cdot C_{PDCCH}^{max,(X,Y),\mu} \cdot N_{cells,r16}^{DL,(X,Y),\mu} / \Sigma_{j=0}^{1} N_{cells,r16}^{DL,j} \rfloor \quad (8)$$

In certain embodiments, for each scheduled cell, the UE is not required to monitor on the active DL BWP with SCS configuration µ of the scheduling cell, from the $N_{cells,r16}^{DL,(X,Y),\mu}$ downlink cells using combination (X, Y), more than min ($M_{PDCCH}^{max,(X,Y),\mu}$, $M_{PDCCH}^{total,(X,Y),\mu}$) PDCCh candidates or more than min ($C_{PDCCH}^{max,(X,Y),\mu}$, $C_{PDCCH}^{total,(X,Y),\mu}$) non-overlapped CCEs per span.

In certain embodiments, a UE (such as the UE 116) does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE (such as the UE 116) does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided PDCCHMonitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

For all search space sets within a slot n or within a span in slot n, denote by $S_{css}$ a set of CSS sets with cardinality of $I_{css}$ and by $S_{uss}$ a set of USS sets with cardinality of $J_{uss}$. The location of USS sets $S_j$, $0 \le j < J_{uss}$, in $S_{uss}$ is according to an ascending order of the search space set index.

Denote by $M_{S_{css}(i)}^{(L)}$, $0 \le i < I_{css}$, the number of counted PDCCH candidates for monitoring for CSS set $S_{css}(i)$ and by $M_{S_{css}(j)}^{(L)}$, $0 \le j < J_{uss}$, the number of counted PDCCH candidates for monitoring for USS set $S_{uss}(j)$.

For the CSS sets, a UE monitors $$M_{PDCCH}^{CSS} = \sum_{i=0}^{I_{css}-1} \sum_{L} M_{S_{css}(i)}^{(L)}$$

PDCCH candidates requiring a total of $C_{PDCCS}^{CSS}$ non-overlapping CCEs in a slot or in a span.

The UE allocates PDCCH candidates for monitoring to USS sets for the primary cell having an active DL BWP with SCS configuration µ in a slot if the UE is not provided PDCCHMonitoringCapabilityConfig for the primary cell or if the UE is provided PDCCHMonitoringCapabilityConfig=r15monitoringcapability for the primary cell, or in the first span of each slot if the UE is provided PDCCHMonitoringCapabilityConfig=r16monitoring- capability for the primary cell, according to the following pseudocode. If for the USS sets for scheduling on the primary cell the UE is not provided CORESETPoolIndex for first CORESETs, or is provided CORESETPoolIndex with value 0 for first CORESETs, and is provided CORESETPoolIndex with value 1 for second CORESETs, and if Equation (9) is satisfied or Equation (10) is satisfied, the following pseudocode (denoted as Syntax (1), below) applies only to USS sets associated with the first CORESETs. A UE does not expect to monitor PDCCH in a USS set without allocated PDCCH candidates for monitoring. In the following pseudocode, if the UE is provided PDCCHMonitoringCapabilityConfig=r16monitoring- capability for the primary cell, $M_{PDCCH}^{max,slot,\mu}$ and $C_{PDCCH}^{max,slot,\mu}$ are replaced by $M_{PDCCH}^{max,(X,Y),\mu}$ and $C_{PDCCH}^{max,(X,Y),\mu}$ respectively, and $M_{PDCCH}^{total,slot,\mu}$ and $C_{PDCCH}^{total,slot,\mu}$ are replaced by $M_{PDCCH}^{total,(X,Y),\mu}$ and $C_{PDCCH}^{total,(X,Y),\mu}$ respectively.

$$\min(\gamma \cdot M_{PDCCH}^{max,slot,\mu}, M_{PDCCH}^{total,slot,\mu}) \ge \min(M_{PDCCH}^{max,slot,\mu}, M_{PDCCH}^{total,slot,\mu}) \quad (9)$$

$$\min(\gamma \cdot C_{PDCCH}^{max,slot,\mu}, C_{PDCCH}^{total,slot,\mu}) \ge \min(C_{PDCCH}^{max,slot,\mu}, C_{PDCCH}^{total,slot,\mu}) \quad (10)$$

In Syntax (1), denote by $V_{CCE}(S_{uss}(j))$ the set of non-overlapping CCEs for search space set $S_{uss}(j)$ and by $\ell(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$.

Syntax

Set $M_{PDCCH}^{uss} = \min(M_{PDCCH}^{max,slot,\mu}, M_{PDCCH}^{total,slot,\mu}) - M_{PDCCH}^{css}$ (1)

Set $C_{PDCCH}^{uss} = \min(C_{PDCCH}^{max,slot,\mu}, C_{PDCCH}^{total,slot,\mu}) - C_{PDCCH}^{css}$ Set $j = 0$ while $\sum_L M_{S_{nss}(j)}^{(L)} \leq M_{PDCCH}^{uss}$ AND $\mathcal{C}(V_{CCE}(S_{uss}(j))) \leq C_{PDCCH}^{uss}$ allocate $\sum_L M_{S_{uss}(j)}^{(L)}$ PDCCH candidates for monitoring to USS set $S_{USS}(j)$ $M_{PDCCH}^{uss} = M_{PDCCH}^{uss} - \sum_L M_{S_{uss}(j)}^{(L)}$;

$C_{PDCCH}^{uss} = C_{PDCCH}^{uss} - \mathcal{C}(V_{CCE}(S_{uss}(j)))$;

$j = j + 1$;

end while

If a UE (i) is configured for single cell operation or for operation with carrier aggregation in a same frequency band, and (ii) monitors PDCCH candidates in overlapping PDCCH monitoring occasions in multiple CORESETs that have same or different QCL-TypeD properties on active DL BWP(s) of one or more cells the UE monitors PDCCHs only in a CORESET. Additionally, in this example, the monitors PDCCHs and in any other CORESET from the multiple CORESETs having same QCL-TypeD properties as the CORESET, on the active DL BWP of a cell from the one or more cells. Here, the CORESET corresponds to the CSS set with the lowest index in the cell with the lowest index containing CSS, if any; otherwise, to the USS set with the lowest index in the cell with lowest index. The lowest USS set index is determined over all USS sets with at least one PDCCH candidate in overlapping PDCCH monitoring occasions. For the purpose of determining the CORESET, a SS/PBCH block is considered to have different QCL-TypeD properties than a CSI-RS For the purpose of determining the CORESET, a first CSI-RS associated with a SS/PBCH block in a first cell and a second CSI-RS in a second cell that is also associated with the SS/PBCH block are assumed to have same QCL-TypeD properties. The allocation of non-overlapping CCEs and of PDCCH candidates for PDCCH monitoring is according to all search space sets associated with the multiple CORESETs on the active DL BWP(s) of the one or more cells. The number of active TCI states is determined from the multiple CORESETs.

In certain embodiments, if a UE (i) is configured for single cell operation or for operation with carrier aggregation in a same frequency band, and (ii) monitors PDCCH candidates in overlapping PDCCH monitoring occasions in multiple CORESETs where none of the CORESETs has TCI-states with 'QCL-TypeD', then the UE is required to monitor PDCCH candidates in overlapping PDCCH monitoring occasions for search space sets associated with different CORESETs.

It is noted that the embodiments of this disclosure, various scenarios are considered wherein a UE can be configured to monitor PDCCH for a serving cell on two or more scheduling cells. The serving cell can be a primary cell, such as a PCell or a PSCell or a SpCell, or a secondary cell (SCell). The two or more scheduling cells can include a primary cell or a secondary cell. Scheduling operation or PDCCH monitoring can refer to self-carrier scheduling (also referred to as, self-scheduling) or cross-carrier scheduling.

In one example, a serving cell can be a primary cell and the corresponding two scheduling cells can include the primary cell for self-carrier scheduling and a secondary cell (SCell) for cross-carrier scheduling of the primary cell, wherein such SCell is also referred to as scheduling/special SCell or "sSCell".

In another example, a serving cell can be a first S Cell and the corresponding two scheduling cells can include: (i) a primary cell for cross-carrier scheduling of the first SCell and the first SCell for self-carrier scheduling, (ii) a second SCell, different from the first SCell, for cross-carrier scheduling of the first SCell and the first SCell for self-carrier scheduling, (iii) a primary cell and a second SCell different from the first SCell, both for cross-carrier scheduling of the first SCell, or (iv) a second SCell and a third SCell, both different from the first SCell, and both for cross-carrier scheduling of the first SCell.

In yet another example, a UE (such as the UE 116) can monitor PDCCH on multiple scheduling cells at same or different monitoring occasions (MOs). For example, the UE can be configured to monitor PDCCH on the two scheduling cells in MOs that include overlapping MOs, where the first and the second scheduling cells are for a same serving/scheduled cell. For another example, the UE can be configured with a first set of PDCCH MOs on a first scheduling cell, and with a second set of PDCCH MOs on a second scheduling cell. Herein, the first set and the second set of PDCCH MOs do not overlap in time, such as when the first and second sets of PDCCH MOS are in different slots or in different spans of a slot. For yet another example, the UE can be configured with two scheduling cells, wherein any slot or span can include PDCCH MOs on at most one scheduling cell based on network indication, such as a DCI format, or a MAC-CE command.

It is noted that although CA is considered in this disclosure, the embodiments are equally applicable to scenarios with multiple transmission and reception points (multi-TRP) in one or multiple serving/scheduled/scheduling cell, wherein same and/or different spatial settings/relations/beams can be additionally used.

Embodiments of the present disclosure describe MBS for the case of two (simultaneous) scheduling cells for a scheduled cell. This is described in the following examples and embodiments, such as those of FIG. 6.

Figure 6:
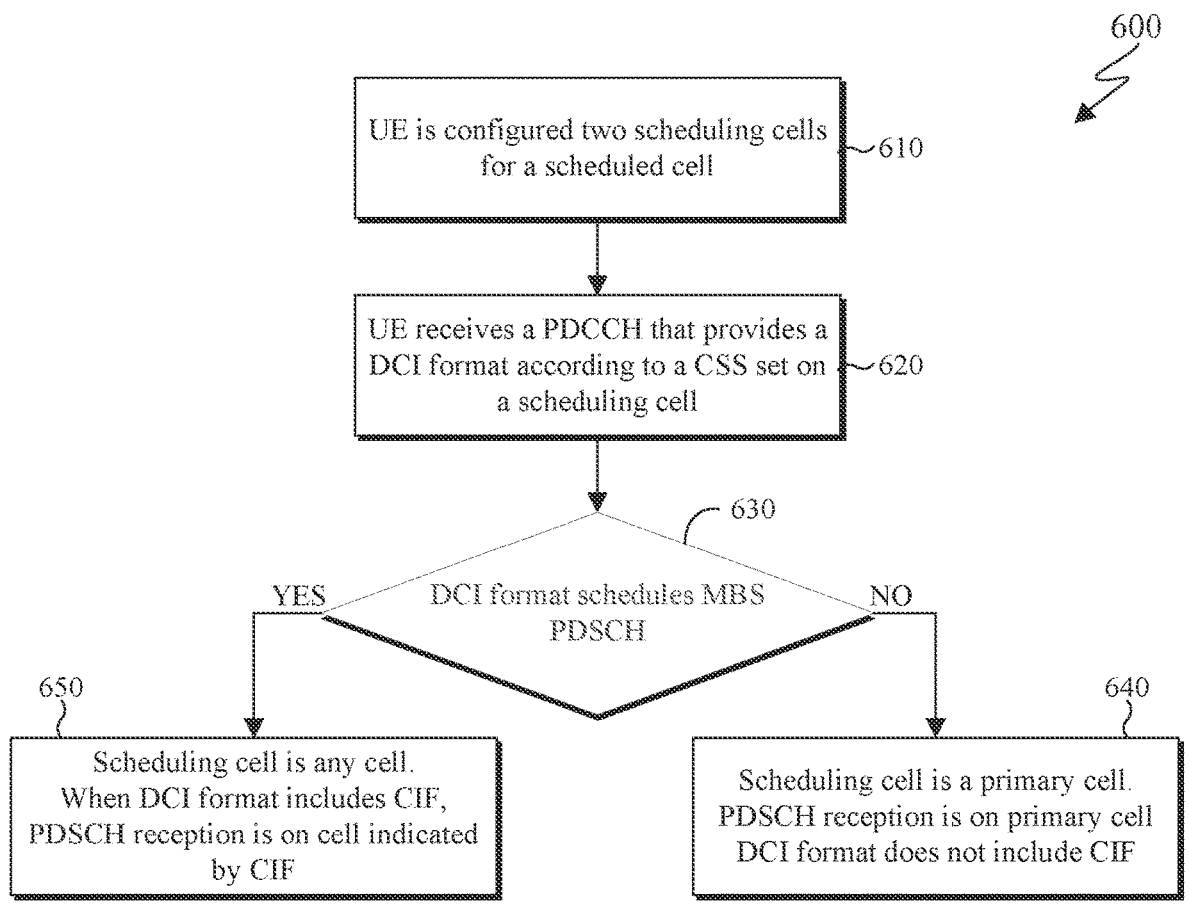
FIG. 6 illustrates an example method for scheduling unicast physical downlink shared channel (PDSCH) receptions and multicast and broadcast services (MBS) PDSCH receptions from two scheduling cells on a scheduled cell according to embodiments of the present disclosure.

FIG. 6 illustrates an example method 600 for scheduling unicast PDSCH receptions and MBS PDSCH receptions from two scheduling cells on a scheduled cell according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

In certain embodiments, a UE (such as the UE 116) can be configured multiple scheduling cells for a scheduled cell. For example, a scheduled cell is a primary cell and has the primary cell and a sSCell as scheduling cells. The UE can also be configured to monitor PDCCH according to CSS sets for scheduling PDSCH receptions such as ones associated with multicast or broadcast traffic. For brevity, the term MBS is used in the following descriptions. A DCI format scheduling an MBS PDSCH can be differentiated from a DCI format scheduling a unicast PDSCH based on a corresponding indicator field in each DCI format, or based on different sizes for each DCI format, or based on a different RNTI to scramble a CRC in each DCI format. For example, a DCI format scheduling a unicast PDSCH reception can have a CRC scrambled by a C-RNTI while a DCI format scheduling an MBS PDSCH reception can have a CRC scrambled by a group-RNTI (G-RNTI). When a UE is configured for multiple MBS traffic types, the UE can be provided respective multiple G-RNTIs or a DCI format can indicate a traffic type.

In a first realization, a UE (such as the UE 116) can be configured first search space sets on multiple scheduling cells for monitoring PDCCHs that provide DCI formats scheduling unicast PDSCH on a scheduled cell and second search space sets only on a single scheduling cell for monitoring PDCCHs that provide DCI formats scheduling MBS PDSCH on a scheduled cell, wherein for example the single scheduling cell and the scheduled cell can be a primary cell or an SCell. A reason for the restriction for the second search space sets is to maintain a common behavior for both unicast PDSCH and MBS PDSCH wherein scheduling of PDSCH receptions using CSS sets is only from a single scheduling cell to a single scheduled cell, such as the primary cell.

In a second realization, a UE (such as the UE 116) can be configured search space sets on multiple scheduling cells, such as a primary cell or an sSCell, for monitoring PDCCHs that provide DCI formats scheduling unicast PDSCH or MBS PDSCH on a scheduled cell, such as the primary cell or the sSCell. The search space sets associated with scheduling of unicast PDSCH receptions on the sSCell are only USS sets. The search space sets associated with scheduling MBS PDSCH receptions are only CSS sets. In a first approach, MBS PDSCH receptions can only be on the scheduled cell and a DCI format scheduling an MBS PDSCH reception does not include a carrier indicator field.

In a second approach, MBS PDSCH receptions can be on additional scheduled cells and a DCI format scheduling an MBS PDSCH reception includes a CIF to indicate a scheduled cell. DCI formats provided by PDCCH receptions according to CSS sets that schedule unicast PDSCH receptions do not include a CIF and the unicast PDSCH reception can be only on a scheduled cell that is same as the scheduling cell, such as only on a primary cell.

In a third approach, different G-RNTIs or different DCI format sizes can be associated with different scheduled cells for an MBS PDSCH receptions that are scheduled from a same scheduling cell.

Additionally, for any realization, first CORESETs associated with search space sets for DCI formats scheduling MBS PDSCH receptions can be different than second CORESETs associated with search space sets for DCI formats scheduling unicast PDSCH receptions. For example, TCI states for PDCCH receptions in the first CORESETs can be different than TCI states for PDCCH receptions in the second CORESETs as TRPs associated with MBS PDSCH receptions can be different than TRPs associated with unicast PDSCH receptions.

Similar methods can be used for a DCI format that activates a SPS PDSCH for MBS traffic, or for higher layer configuration of a SPS PDSCH for MBS traffic.

The method 600 as illustrated in FIG. 6 describes an example procedure for scheduling unicast PDSCH receptions and MBS PDSCH receptions from two scheduling cells on a scheduled cell according to the disclosure.

In step 610 a UE (such as the UE 116) is configured two scheduling cells for a scheduled cell. For example, the scheduling cells can be a primary cell and a sSCell and the scheduled cell can be the primary cell. In step 620, the UE receives a PDCCH according to a CSS set, wherein the PDCCH provides a DCI format scheduling a PDSCH reception. In step 630, the UE determines whether the PDSCH is an MBS PDSCH. When the PDSCH is not an MBS PDSCH and is a unicast PDSCH (as determined in step 630), the scheduling cell in the primary cell, the scheduled cell is the primary cell, and the DCI format does not include a CIF (step 640). When the PDSCH is an MBS PDSCH (as determined in step 630), the scheduling cell can be any scheduling cell, such as the primary cell or the sSCell, and when the DCI format includes a CIF, the scheduled cell can be any cell, such as the primary cell or the sSCell; otherwise, the scheduled cell is the scheduling cell (step 650).

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure also describes fast replacement of a deactivated scheduling cell for corresponding scheduled cell(s). This is described in the following examples and embodiments, such as those of FIG. 7.

Figure 7:
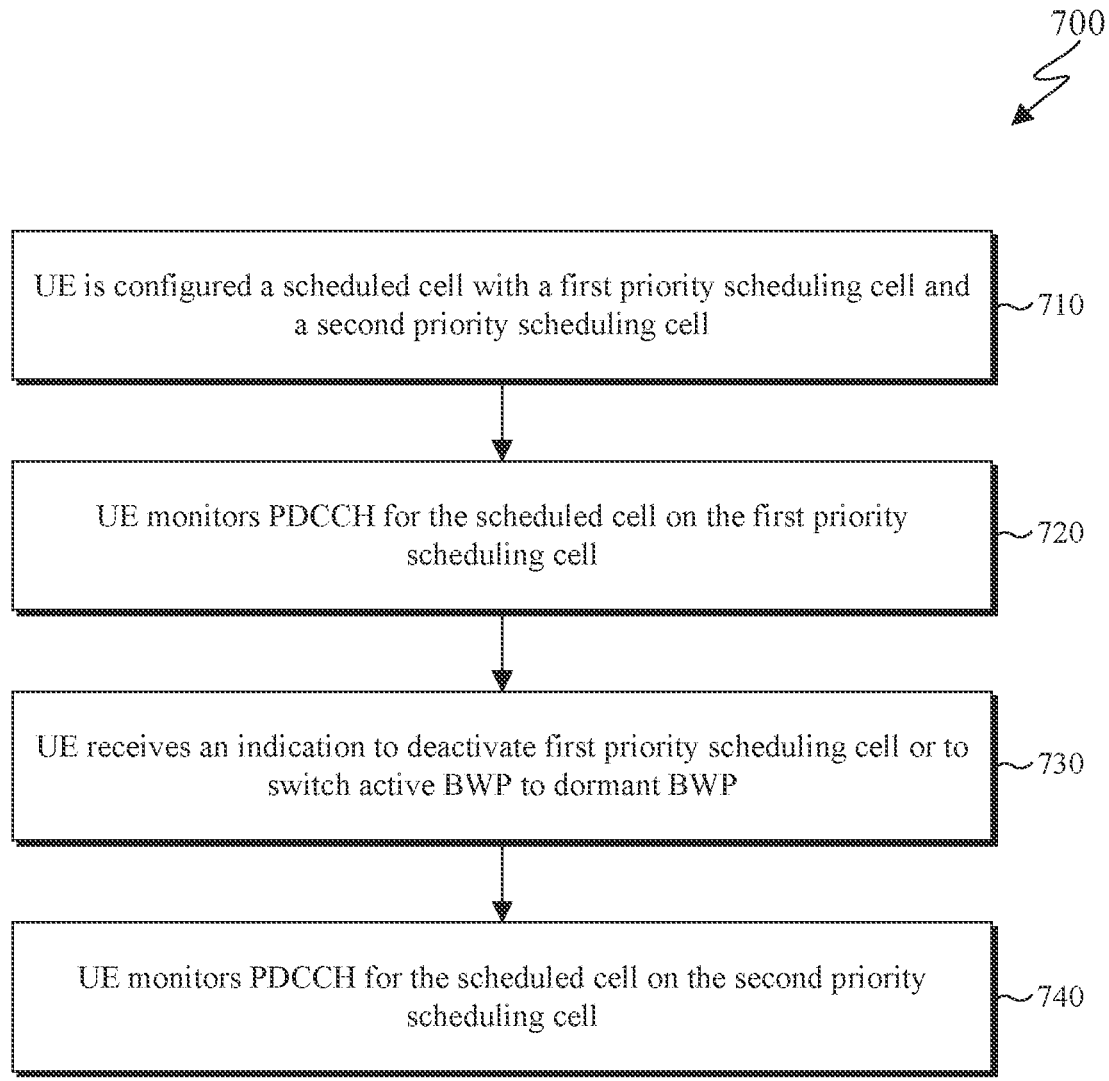
FIG. 7 illustrates an example method for witching from a first scheduling cell for a scheduled cell to a second scheduled cell for the scheduled cell according to embodiments of the present disclosure.

FIG. 7 illustrates an example method 700 for witching from a first scheduling cell for a scheduled cell to a second scheduled cell for the scheduled cell according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

In certain embodiments, a UE (such as the UE 116) can be configured a set of scheduling cells for a scheduled cell. Here only a subset of the set of scheduling cells is active at a time, so that when an active scheduling cell for the scheduled cell is deactivated or changes an active DL BWP to a dormant BWP, the UE monitors PDCCH for the scheduled cell on another scheduling cell from the set of scheduling cells, for example on a scheduling cells with a smallest index that is not deactivated or has a non-dormant BWP as the active DL BWP, without indication corresponding indication or a higher layer reconfiguration by a serving gNB. Such procedure is beneficial for seamless scheduling of scheduled cell(s) while enabling a scheduling cell to be deactivated or change an active DL BWP to a dormant DL BWP.

In one realization, a UE (such as the UE 116) can be configured a scheduled cell with a first scheduling cell as a first priority scheduling cell, and a second scheduling cell as a second priority scheduling cell. For example, the priority can be explicitly indicated by a separate field in the configuration of the scheduling cells or can be implicitly determined according to an index of a scheduling cells wherein, for example, a scheduling cell with a smaller index can have a lower priority. For example, the UE expects to perform PDCCH monitoring for the scheduled cell on the first scheduling cell when the first scheduling cell is activated and has an active DL BWP that is not a dormant DL BWP. When the first scheduling cell is deactivated or the UE changes an active DL BWP on the first scheduling cell to a dormant DL BWP, the UE expects to be scheduled for the scheduled cell by the second scheduling cell, without additional indication from the network, and the reverse. A UE can also have a scheduling cell that is activated, such as a primary cell.

The change of the scheduling cell from the first scheduling cell to the second scheduling cell (and the reverse) can apply after a predetermined time depending on the state of the second scheduling cell. When the second scheduling cell is activated and has an active DL BWP that is not the dormant DL BWP for the UE, the time can be the time required for the UE to determine a deactivation of the first scheduling cell or to determine a change in an active DL BWP to a dormant BWP. When the second scheduling cell is activated and has an active DL BWP that is the dormant DL BWP for the UE, the time can additionally include a BWP switching delay. When the second scheduling cell is deactivated, the time can additionally include the one required for time-frequency tracking, for a AGC settling, for CSI reporting, for an application time of a MAC control element (CE) command when the activation is by a MAC CE, and the like.

For example, when the UE receives a MAC CE command for deactivation of the first scheduling cell in a PDSCH in slot n, or receives a DCI format, such as (i) a DCI format 2_6, (ii) a DCI format 0_1, or (iii) a DCI format 1_1, in slot n that indicates a change in an active DL BWP to a dormant DL BWP for the first scheduling cell, the UE starts to monitor PDCCH for the scheduled cell on the second scheduling cell in the first slot. In a first example, the first slot is after slot $n+3 \cdot N_{slot}^{subframe,\mu}$ where $\mu$ is the SCS configuration for a cell on which the UE received the PDSCH carrying the MAC-CE command. In a second example, the first slot is after a BWP switching time duration, as defined in REF8, after slot n. In a third example, the first slot is after a time duration equal to a PDSCH/PUSCH preparation $T_{proc,1}$ or $T_{proc,2}$ after slot n. In a fourth example, the first slot is after N symbols from the last symbol of a PDCCH in slot n that indicates the dormancy for the first scheduling cell, wherein N is based on a UE capability for PDCCH processing, such as N=5 for $\mu$=0, N=5.5 for $\mu$=1, and N=11 for $\mu$=2, otherwise, N=10 for $\mu$=0, N=12 for $\mu$=1, N=22 for $\mu$=2, and N=25 for $\mu$=3, wherein $\mu$ corresponds to the SCS configuration for the PDCCH. In yet another example, the first slot is a combination of the above time durations.

In one realization, when an SCell is deactivated by a MAC CE command, during the predetermined time duration from a slot in which the UE receives a MAC CE command for deactivation of the first scheduling cell in a PDSCH in slot n, or receives a DCI format, such as (i) a DCI format 2_6, (ii) a DCI format 0_1, or (iii) a DCI format 1_1 in slot n that indicates a dormant DL BWP for the first scheduling cell, until a slot when the UE starts to monitor PDCCH for the scheduled cell on the second scheduling cell. In one example, the UE does not expect to receive a PDCCH for the scheduled cell, either on the first scheduling cell or on the second scheduling cell. In another example, the UE continues to receive PDCCH for the scheduled cell on the first scheduling cell. Thereafter, the UE can continue to receive PDCCH on a third scheduling cell for the scheduled cell, such as on a primary cell.

The UE can monitor PDCCH on a new scheduling cell, such as the second scheduling cell, for scheduling transmissions or receptions on the scheduled cell, or for other indications corresponding to the scheduled cell, after the predetermined time.

In another example, when the first scheduling cell for a scheduled cell is activated or changes an active DL BWP from a dormant DL BWP to a non-dormant DL BWP, the UE expects to be scheduled for the scheduled cell by the first scheduling cell and monitors PDCCH on the first scheduling cell after the predetermined time. Alternatively, the UE can continue to be scheduled for the scheduled cell by the second scheduling cell.

In another realization, a serving cell can be configured with a first scheduling cell and a second scheduling cell wherein either the first or the second scheduling cell is the scheduling cell for a scheduled cell at a time occasion and the change between the first and second scheduling cells as the scheduling cell for the scheduled cell can be indicated to the UE and be possible even when both first and second scheduling cells are activated and have respective non-dormant active DL BWPs. For example, the indication can be by a DCI format. For example, the indication can be for a group of scheduled cells. For example, a UE can be indicated to monitor PDCCH for the scheduled cell on the first scheduling cell when the first scheduling cell is not overloaded for PDCCH transmissions; otherwise, the UE can be indicated to monitor PDCCH for scheduled cell on the second scheduling cell. A change of a scheduling cell due to a deactivation or a change in an active DL BWP from a non-dormant to dormant can additionally apply. Such mechanism enables dynamic load balancing of a PDCCH load among scheduling cells.

In one example, when a scheduled cell for a UE is a primary cell and has the primary cell and a first sSCell as scheduling cells, the UE can be additionally configured with a second sSCell for cross-carrier scheduling on the primary cell. When the first sSCell is deactivated or changes an active DL BWP to a dormant BWP for the UE, the UE starts to monitor PDCCH on the second sSCell for cross-carrier scheduling of the primary cell. In one example, when the second sSCell is a deactivated SCell or has a dormant BWP as active DL BWP when the first sSCell is deactivated or changes the active DL BWP to a dormant BWP, the UE can be configured to activate the second sSCell or (when applicable) change the active BWP of the second sSCell to a non-dormant BWP and then, after a predetermined time, the UE starts to monitor PDCCH on the second sSCell for cross-carrier scheduling of the primary cell.

In one example, when a UE monitors PDCCH on a second sSCell for scheduling on the primary cell and the UE determines that the first sSCell is activated or changes an active DL BWP to a non-dormant BWP, the UE reverts to the first sSCell for PDCCH monitoring for scheduling on the primary cell and stops PDCCH monitoring on the second sSCell. In another option, the UE continues to monitor PDCCH on the second sSCell until the UE receives an indication from a serving gNB, including possibly via a timer expiration, to monitor PDCCH on the first sSCell for scheduling on the primary cell or until the second sSCell is deactivated or changes an active DL BWP to a dormant BWP and then the UE reverts to the first sSCell for PDCCH monitoring for scheduling on the primary cell. Same principles can also apply when the scheduled cell is not the primary cell.

The method 700 as illustrated in FIG. 7 describes an example procedure for switching from a first scheduling cell for a scheduled cell to a second scheduling cell for the scheduled cell according to the disclosure.

In step 710, a UE (such as the UE 116) is configured a scheduled cell with a first priority scheduling cell and a second priority scheduling cell. In step 720, the UE monitors PDCCH for the scheduled cell on the first priority scheduling cell, in step 730, the UE receives an indication to deactivate the first priority scheduling cell or to switch an active BWP to a dormant BWP for the first priority scheduling cell. For example, the indication can be by a DCI format or by a MAC-CE command. In step 740, the UE starts to monitor PDCCH for the scheduled cell on the second priority scheduling cell. The PDCCH monitoring on the second priority scheduling cell can be after a predetermined time.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

Embodiments of the present disclosure further describe cross-BWP configuration of search space sets for cross-carrier scheduling. This is described in the following examples and embodiments, such as those of FIG. 8.

Figure 8:
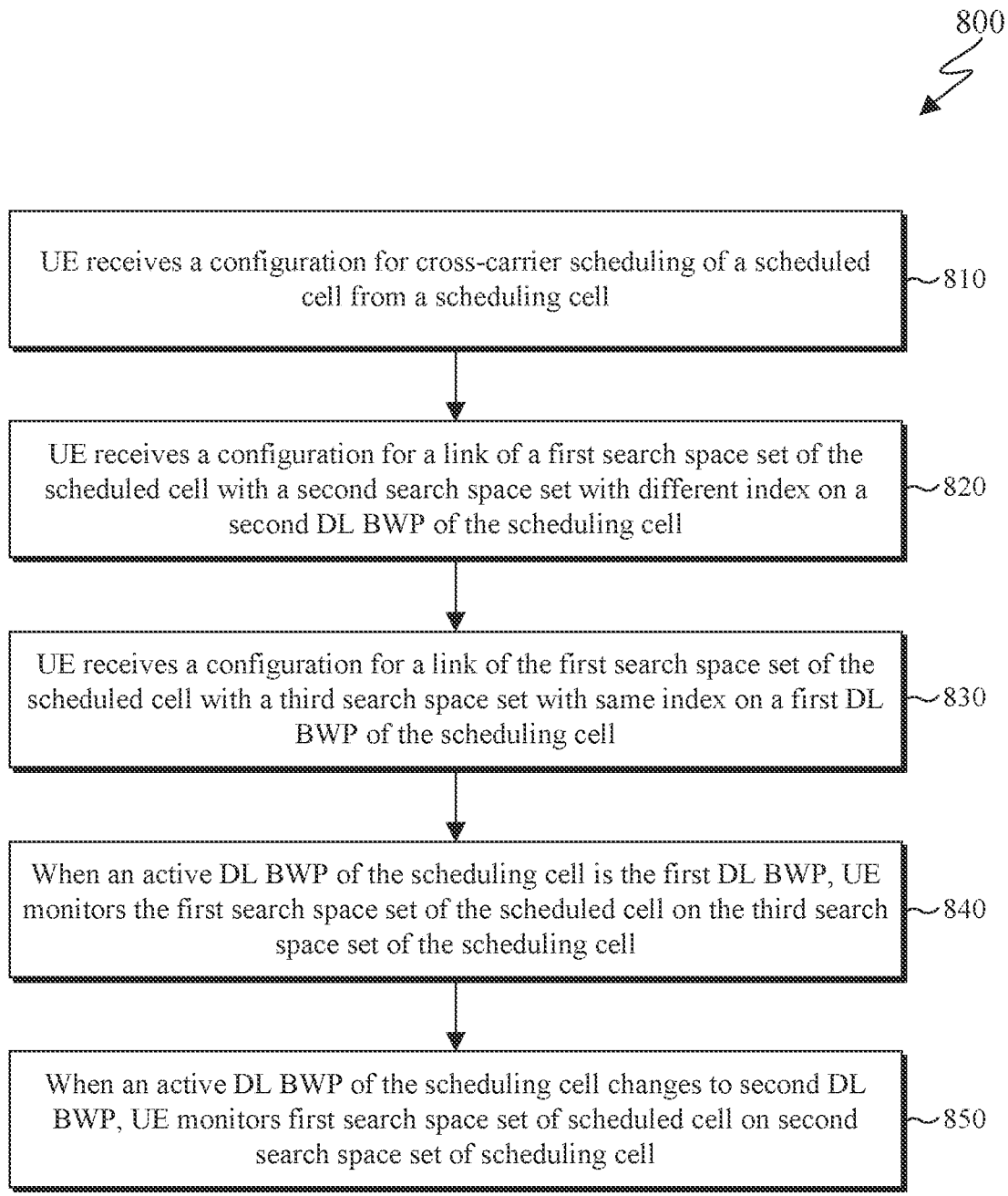
FIG. 8 illustrates an example method for a cross bandwidth part (BWP) configuration of linked search space sets for cross-carrier scheduling according to embodiments of the present disclosure.

FIG. 8 illustrates an example method 800 for a cross-BWP configuration of linked search space sets for cross-carrier scheduling according to embodiments of the present disclosure. The steps of the method 800 of FIG. 8 can be performed by any of the UEs 111-116 of FIG. 1, such as the UE 116 of FIG. 3. The method 800 is for illustration only and other embodiments can be used without departing from the scope of the present disclosure.

In certain embodiments, a UE can be configured with a first search space set on a scheduled cell that is linked with a second search space set that is configured on a second BWP of a scheduling cell, wherein the first search space set and the second search space set have different indexes, and wherein the second BWP is different from a first BWP of the scheduling cell where the UE is configured a third search space set with a same index as the first search space set.

In a variation, the UE can be configured with a first search space set on the scheduled cell that is linked with both a second search space set and a third search space set on a scheduling cell, wherein (i) the second search space set (a) is configured on the second BWP of the scheduling cell, and (b) has a different index compared to an index of the first search space set; (ii) the third search space set (a) is configured on the first BWP of the scheduling cell, and (b) has a same index as the first search space set; and (iii) the first BWP and the second BWP are different.

It is noted that such a mechanism enables flexible PDCCH monitoring for the scheduled cell on the scheduling cell, without restriction on the dynamic BWP switching on both the scheduled cell and the scheduling cell.

For example, when an active BWP for the scheduling cell changes from a first BWP to a second BWP, the UE can continue to monitor PDCCH for the scheduled cell on the first search space set. Such PDCCH monitoring may not be possible when there is no link between the first search space set and the second search space set.

The UE uses a search space set for PDCCH monitoring for the scheduled cell only when the DL BWPs where the linked search space sets are configured in the scheduling cell and the scheduled cell are both active. The search space set index is unique in each BWP of a serving cell. Also, a CORESET associated with a search space set is configured in a same BWP as the search space set.

Syntax (2), below, describes an example RRC configuration for cross-BWP link of a search space set on a scheduled cell with multiple search space sets on a scheduling cell.

```
Syntax                                                                       (2)
SearchSpace ::=         SEQUENCE {
    searchSpaceId           SearchSpaceId,
    schedulingCellId        ServCellIndex,
    linkedSearchSpaces      SEQUENCE (SIZE (1... 4)) OF linkedSearchSpace }
}
linkedSearchSpace ::=   SEQUENCE {
    searchSpaceId           SearchSpaceId,
    nrofCandidates          SEQUENCE {
        aggregationLevel1       ENUMERATED {n0, n1, n2, n3, n4, n5, n6, n8},
        aggregationLevel2       ENUMERATED {n0, n1, n2, n3, n4, n5, n6, n8},
        aggregationLevel4       ENUMERATED {n0, n1, n2, n3, n4, n5, n6, n8},
        aggregationLevel8       ENUMERATED {n0, n1, n2, n3, n4, n5, n6, n8},
        aggregationLevel16      ENUMERATED {n0, n1, n2, n3, n4, n5, n6, n8}
    }
    OPTIONAL, -- Cond Setup
}
```

The method 800 as illustrated in FIG. 8 describes an example procedure for a cross-BWP configuration of linked search space sets for cross-carrier scheduling according to the disclosure.

In step 810, a UE (such as the UE 116) receives a configuration for cross-carrier scheduling of a scheduled cell by a scheduling cell. In step 820, the UE receives a configuration for a link of a first search space set of the scheduled cell with a second search space set on a second DL BWP of the scheduling cell, wherein the first search space set and the second search space set have different indexes. In step 830, the UE receives a configuration for a link of the first search space set of the scheduled cell with a third search space set on a first DL BWP of the scheduling cell, wherein the first search space set has a same index as the third search space set. In step 840, when an active DL BWP of the scheduling cell is the first DL BWP, the UE monitors the first search space set of the scheduled cell on the third search space set of the scheduling cell. In step 850, when an active DL BWP of the scheduling cell changes to the second DL BWP, the UE monitors the first search space set of the scheduled cell on the second search space set of the scheduling cell.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also describe a UE procedure for search space set dropping for a scheduled cell with multiple scheduling cells in a slot or span.

In certain embodiments, when a UE is configured/indicated to monitor PDCCH for a serving cell on multiple scheduling cells in a same slot or span, the UE can apply prioritization rules for PDCCH monitoring for the search space sets on the multiple scheduling cells. The search space sets can include one or more common search space (CSS) sets, or one or more UE-specific search space (USS) sets. The UE can drop search space sets on one or more of the multiple scheduling cell(s) based on the prioritization rules when a number of monitored PDCCH candidates or a number of monitored non-overlapping CCEs in a slot exceed(s) corresponding limit(s). In the following, for brevity, such an event is referred to as PDCCH overbooking.

In order to determine a PDCCH overbooking event in a slot or span for a scheduled cell, a UE counts a number of PDCCH candidates and a number of non-overlapping CCEs that the UE monitors in a slot or span for the scheduled cell. In a first approach, the UE counts a number of PDCCH candidates or a number of non-overlapping CCEs separately for each scheduling cell for the scheduled cell. In a second approach, the UE counts the number of PDCCH candidates or a number of non-overlapping CCEs jointly across all scheduling cells for a scheduled cell. Overbooking procedures are subsequently described for each approach.

Embodiments of the present disclosure also describe a UE procedure for search space set dropping for a scheduled cell when counting PDCCH candidates or non-overlapping CCEs for the scheduled cell separately per scheduling cell from the multiple scheduling cell. This is described in the following examples and embodiments, such as those of FIG. 9.

Figure 9:
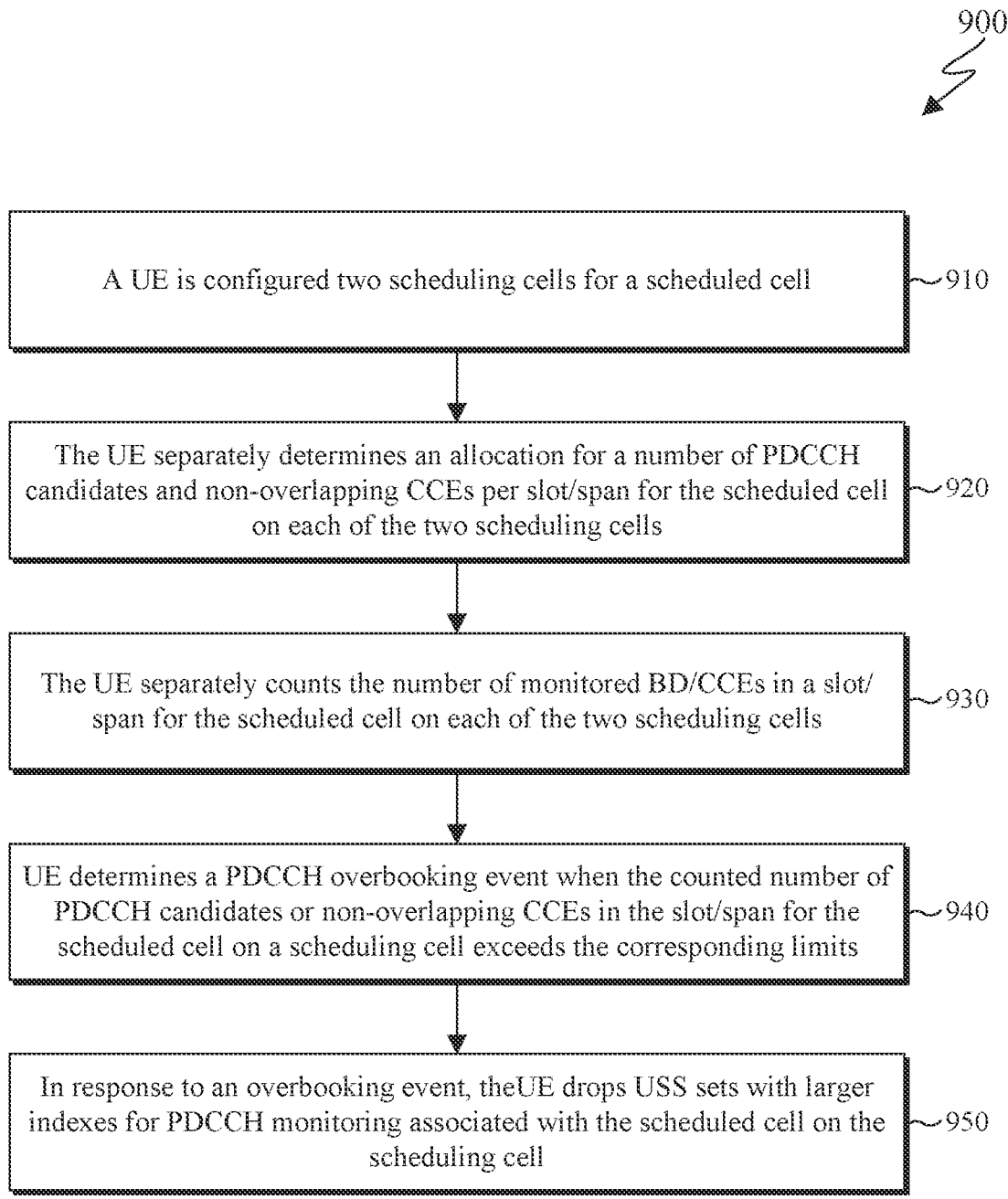
FIG. 9 illustrates an example method for PDCCH overbooking and dropping when monitored PDCCH candidates and non-overlapping control channel elements (CCEs) for a scheduled cell are counted separately on each scheduling cell according to embodiments of the present disclosure.

FIG. 9 illustrates an example method 900 for PDCCH overbooking and dropping when monitored PDCCH candidates and non-overlapping CCEs for a scheduled cell are counted separately on each scheduling cell according to embodiments of the present disclosure. The steps of the method 900 of FIG. 9 can be performed by any of the UEs 111-116 of FIG. 1, such as the UE 116 of FIG. 3. The method 900 is for illustration only and other embodiments can be used without departing from the scope of the present disclosure.

In certain embodiments a UE (such as the UE 116) determines an overbooking event for a scheduled cell on a slot or span individually for any scheduling cell for the scheduled cell. Such an approach can be applicable, for example, when the UE counts a number of PDCCH candidates or a number of non-overlapping CCEs for a scheduled cell separately for each of the multiple scheduling cells.

In one example, the UE counts a number of PDCCH candidates or a number of non-overlapping CCEs in a slot or span on each scheduling cell for a scheduled cell according to a SCS configuration for PDCCH transmissions on the scheduling cell, and compares the number with a corresponding limit for the PDCCH candidates or the non-overlapping CCEs for the scheduled cell on the scheduling cell for the SCS configuration.

A UE can determine an overbooking event for a scheduled cell in a slot or span per scheduling cell for the scheduled cell. For example, the UE determines an overbooking event for the scheduled cell when a number of PDCCH candidates or non-overlapping CCEs in a first slot of a first scheduling cell for the scheduled cell exceeds a limit for a number of PDCCH candidates or non-overlapping CCEs for PDCCH receptions with a first SCS configuration on the first scheduling cell. Alternatively, the UE determines an overbooking event for the scheduled cell when a number of PDCCH candidates or non-overlapping CCEs in a second slot of a second scheduling cell for the scheduled cell exceeds a limit for a number of PDCCH candidates or non-overlapping CCEs for PDCCH receptions with a second SCS configuration on the second scheduling cell.

When a UE (such as the UE 116) determines an overbooking event for the scheduled cell on the first scheduling cell or the second scheduling cell, the UE separately applies prioritization rules among search space sets for PDCCH monitoring on the corresponding first or second scheduling cell. The UE first allocates PDCCH candidates or non-overlapping CCEs to CSS sets, if any, for the scheduled cell on the corresponding first or second scheduling cells, and then allocates remaining PDCCH candidates or non-overlapping CCEs to first USS sets in increasing/ascending order of a USS set index. The UE drops PDCCH monitoring for second USS sets with larger indexes when the UE cannot monitor all PDCCH candidates in a USS set from the second USS sets with a smallest or smaller index.

For example, when a UE is configured for a primary cell as a scheduled cell with both self-carrier scheduling and cross-carrier scheduling from an sSCell, the UE performs an overbooking determination and potential search space set dropping, such as USS set dropping, separately on the primary cell and on the sSCell.

The UE can also determine a limit for a number of PDCCH candidates or non-overlapping CCEs in a slot or span separately for each of the scheduling cells. For example, the limit can be a predetermined limit for a number of PDCCH candidates such as $\min(M_{PDCCH}^{total,slot,\mu 1}, M_{PDCCH}^{max,slot,\mu 1})$ or $\min(M_{PDCCH}^{total,slot,\mu 2}, M_{PDCCH}^{max,slot,\mu 2})$ corresponding to a first SCS configuration $\mu 1$ for a first scheduling cell and a second SCS configuration $\mu 2$ for a second scheduling cell, and similar for a predetermined limit for a number of non-overlapping CCEs. For another example, the limit can be a scaled version of a predetermined limit for a number of PDCCH candidates such as $\alpha \cdot \min(M_{PDCCH}^{total,slot,\mu 1}, M_{PDCCH}^{max,slot,\mu 1})$ or $\beta \cdot \min(M_{PDCCH}^{total,slot,\mu 2}, M_{PDCCH}^{max,slot,\mu 2})$, wherein parameters $0 \leq \alpha \leq 1$ and $0 \leq \beta \leq 1$ can be provided by higher layers, or can be predetermined in the specifications of the system operation, and similar for a predetermined limit for a number of non-overlapping CCEs. For another example, the limit can be another scaled version of a predetermined limit for a number of PDCCH candidates, wherein a scaling is applied only to a component of the limit, such as $\min(M_{PDCCH}^{total,slot,\mu 1}, \alpha \cdot M_{PDCCH}^{max,slot,\mu 1})$ or $\min(M_{PDCCH}^{total,slot,\mu 2}, \beta \cdot M_{PDCCH}^{max,slot,\mu 2})$, and similar for a predetermined limit for a number of non-overlapping CCEs. For another example, the limit can be a predetermined maximum/total limit on a number of BDs or non-overlapping CCEs corresponding to a minimum (or maximum) SCS/numerology among the scheduling cells for the scheduled cell, such as $\min(M_{PDCCH}^{total,slot,\mu^*}, M_{PDCCH}^{max,slot,\mu^*})$ wherein $\mu^* = \min\{\mu 1, \mu 2\}$. For yet another example, the limit can be a further variation of a scaled maximum/total limit, such as $\min(M_{PDCCH}^{total,slot,\mu 1}, M_{PDCCH}^{total,slot,\mu 2}, \alpha M_{PDCCH}^{max,slot,\mu 1}, \beta M_{PDCCH}^{max,slot,\mu 2})$.

In certain embodiments, SS set dropping can also apply to CSS sets. For example, a UE can be configured with allocation scaling parameters $0 \leq \alpha \leq 1$ and $0 \leq \beta \leq 1$ for PDCCH candidates and non-overlapping CCEs, as discussed earlier, such that the UE cannot monitor all PDCCH candidates or non-overlapping CCEs for all CSS set sets in a slot/span on the first or on the second scheduling cell of a scheduled cell. In such case, the UE can apply SS set dropping for CSS sets. For example, the UE allocates PDCCH candidates or non-overlapping CCEs in a slot/span to CSS sets with lower indexes, starting from CSS index i=0, continues in an ascending order of a CSS set index, and stops at a CSS set with index i when the remaining PDCCH candidates or non-overlapping CCEs are smaller than the PDCCH candidates or non-overlapping CCEs, respectively, for CSS set i. In such case, the UE drops PDCCH monitoring for CSS sets with indexes larger than or equal to i and all USS sets in the slot/span.

The method 900 as illustrated in FIG. 9 describes an example procedure for PDCCH overbooking and dropping when monitored PDCCH candidates and non-overlapping CCEs for a scheduled cell are counted separately on each scheduling cell.

In step 910, a UE (such as the UE 116) is configured two scheduling cells for a scheduled cell. In step 920, the UE separately determines a limit for a number of PDCCH candidates and non-overlapping CCEs for PDCCH monitoring per slot/span for the scheduled cell on each of the two scheduling cells. For example, such separate allocation can be based on corresponding scaling parameters $0 \leq \alpha \leq 1$ or $0 \leq \beta \leq 1$, as previously described. In step 930, The UE separately counts the number of monitored PDCCH candidates and non-overlapping CCEs in a slot/span for the scheduled cell on each of the two scheduling cells. In step 940, the UE determines a PDCCH overbooking event when the counted number of PDCCH candidates or non-overlapping CCEs in the slot/span for the scheduled cell on a scheduling cell exceeds the corresponding limits for PDCCH candidates or non-overlapping CCEs. In response to a PDCCH overbooking event, the UE in step 950 drops USS sets with larger indexes for PDCCH monitoring associated with the scheduled cell on the scheduling cell.

Although FIG. 9 illustrates the method 900 various changes may be made to FIG. 9. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure also describe a UE procedure for search space set dropping for a scheduled cell when counting PDCCH candidates or non-overlapping CCEs for the scheduled cell jointly across all scheduling cells. This is described in the following examples and embodiments, such as those of FIGS. 10 and 11.

Figure 10:
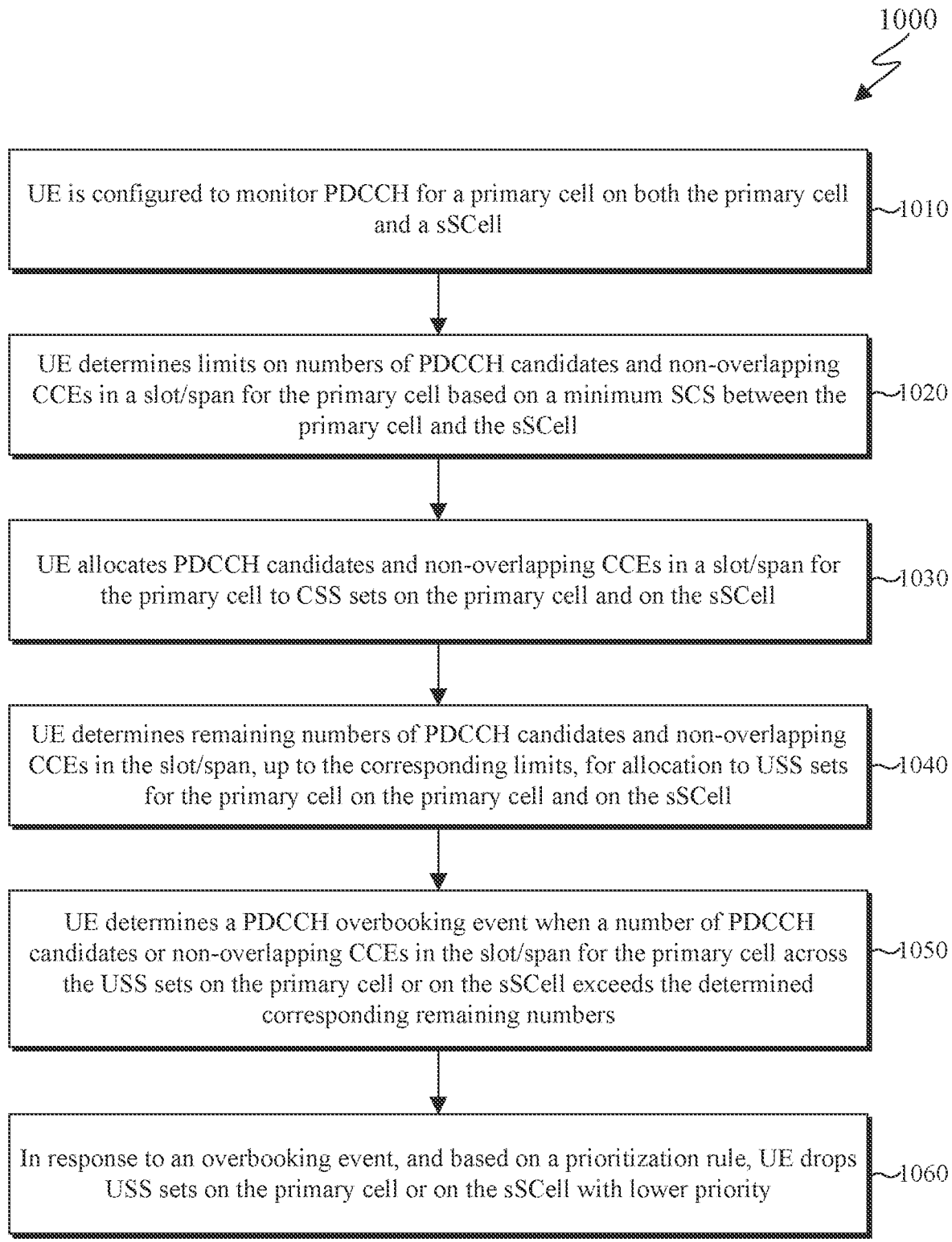
FIG. 10 illustrates an example method for PDCCH overbooking and dropping for a primary cell that is scheduled by both a primary cell and a special secondary cell (sSCell) according to embodiments of the present disclosure; according to embodiments of the present disclosure.
Figure 11:
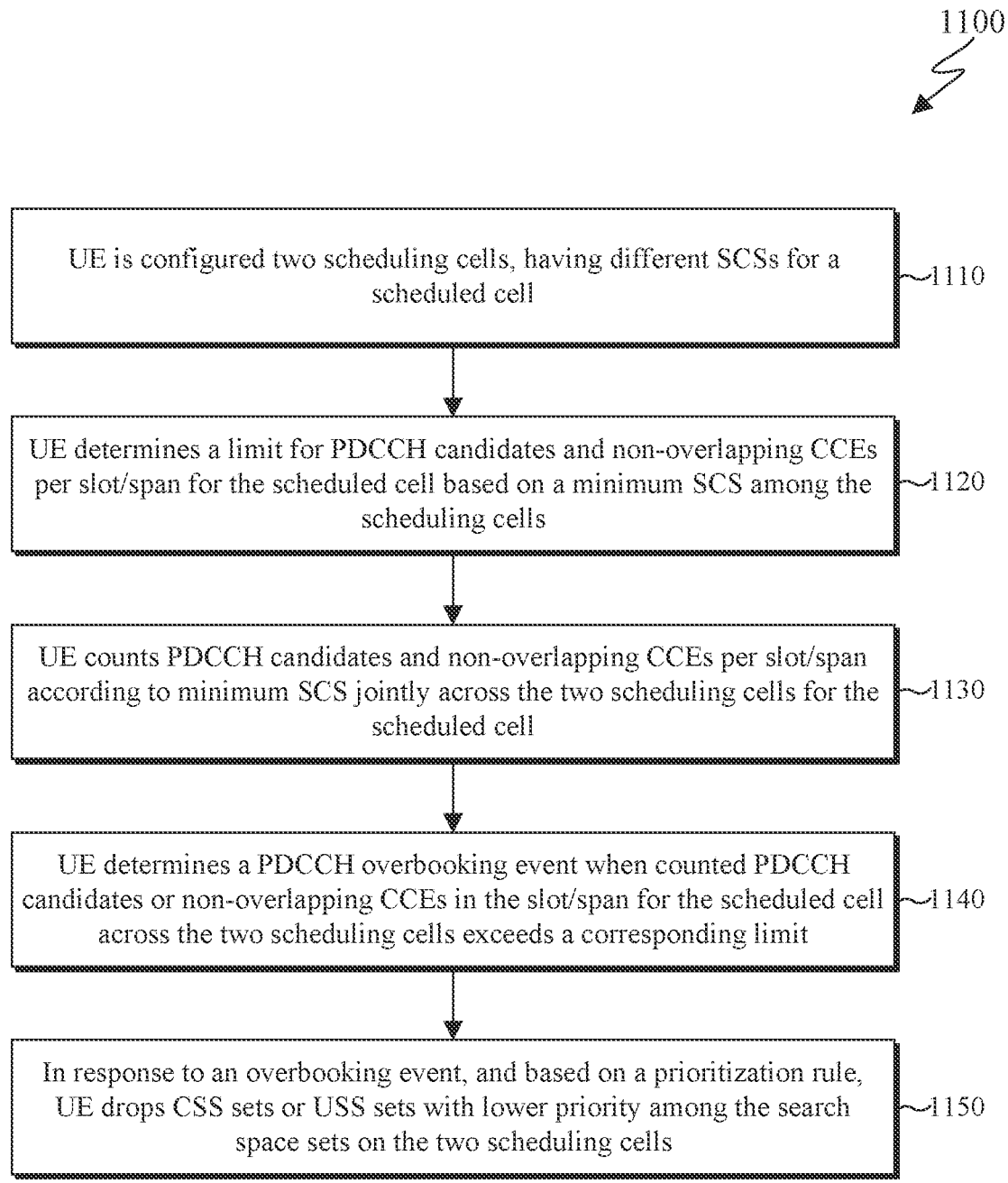
FIG. 11 illustrates an example method for PDCCH overbooking and dropping of search space sets when monitored PDCCH candidates and non-overlapping CCEs for a scheduled cell are jointly counted across two scheduling cells according to embodiments of the present disclosure.

FIG. 10 illustrates an example method 1000 for PDCCH overbooking and dropping for a primary cell that is scheduled by both a primary cell and an sSCell according to embodiments of the present disclosure; according to embodiments of the present disclosure. FIG. 11 illustrates an example method 1100 for PDCCH overbooking and dropping of search space sets when monitored PDCCH candidates and non-overlapping CCEs for a scheduled cell are jointly counted across two scheduling cells according to embodiments of the present disclosure. The steps of the method 1000 of FIG. 10 and the method 1100 of FIG. 11 can be performed by any of the UEs 111-116 of FIG. 1, such as the UE 116 of FIG. 3. The method 1000 and the method 1100 are for illustration only and other embodiments can be used without departing from the scope of the present disclosure.

In a second approach, a UE (such as the UE 116) determines an overbooking event for a scheduled cell when the UE counts a number of PDCCH candidates or a number of non-overlapping CCEs for a scheduled cell jointly across the multiple scheduling cells for the scheduled cell, and the counted number(s) exceed(s) a corresponding limit on a number of PDCCH candidates or a number of non-overlapping CCEs.

When, for a scheduled cell, a UE is configured to monitor PDCCH on multiple scheduling cells that have a same SCS configuration on corresponding active DL BWPs, the UE counts a number of PDCCH candidates or non-overlapping CCEs for the scheduled cell in a slot/span across all scheduling cells and compares the counted numbers to corresponding maximum/total limits for the SCS configuration.

When, for a scheduled cell, the UE is configured to monitor PDCCH on two scheduling cells that have different SCS configurations on corresponding active DL BWPs, the UE counts a number of monitored PDCCH candidates or non-overlapping CCEs for a scheduled cell based on a slot/span that is determined according to one of the following options. In one option (denoted as option one), the UE counts a number of monitored PDCCH candidates or non-overlapping CCEs for a scheduled cell according to a slot/span corresponding to a scheduling cell with a smaller SCS configuration. In another option (denoted as option two), the UE counts a number of monitored PDCCH candidates or non-overlapping CCEs for a scheduled cell, according to a slot/span corresponding to a scheduling cell with a larger SCS configuration. In another option (denoted as option three), the UE counts a number of monitored PDCCH candidates or non-overlapping CCEs for a scheduled cell, according to a slot/span corresponding to a SCS configuration for a reference cell, for example the scheduled cell, or a scheduling cell with a higher priority level, such as a primary cell, or a priority based on ascending/descending order of a cell index. In yet another option (denoted as option four), the UE counts a number of monitored PDCCH candidates or non-overlapping CCEs for a scheduled cell, according to a reference slot/span corresponding to a reference SCS configuration that is provided by higher layers or is predetermined in the specifications of the system operation such as an SCS configuration of 15 kHz for FR1 and 120 kHz for FR2.

In one example, for the first option (described above), when multiple slots/spans of a second scheduling cell with a second SCS configuration overlap with a slot/span of a first scheduling cell with a first SCS configuration, wherein the second SCS configuration is larger than the first SCS configuration, the UE counts all PDCCH candidates on the second scheduling cell in the multiple slots/spans together with the number of PDCCH candidates on the first scheduling cell in the slot/span. Similar example applies for counting the number of non-overlapping CCEs. Similar example(s) also apply for any of the third or fourth options, when PDCCH candidates or non-overlapping CCEs on the first or the second scheduling cell(s) have an SCS configuration that is larger than a SCS configuration for a reference cell as in the third option or larger than a reference SCS/numerology as in the fourth option.

In one example, for the second option (described above), a first slot/span of a first scheduling cell with a first SCS configuration partially overlaps with a second slot/span of a second scheduling cell with a second SCS configuration, wherein the first SCS configuration is smaller than the second SCS configuration. Then, in a first realization, the UE counts PDCCH candidates on the first scheduling cell towards the number of PDCCH candidates monitored for the scheduled cell in the second slot/span and corresponding limits are the ones for the second SCS configuration and the second slot/span. In a second realization, the UE counts PDCCH candidates on the second scheduling cell towards the number of PDCCH candidates monitored for the scheduled cell in the first slot/span and corresponding limits are the ones for the first SCS configuration and the first slot/ span. Similar example applies for counting the number of non-overlapping CCEs for the scheduled cell. Similar example(s) also apply for any of the third or fourth options, when PDCCH candidates or non-overlapping CCEs on the first or the second scheduling cell(s) have an SCS configuration that is smaller than a SCS configuration for a reference cell as in the third option or larger than a reference SCS configuration as in the fourth option.

For example, when two scheduling cells have two different SCS configurations $\mu 1$ and $\mu 2$ on respective active DL BWPs, let $BD_1$ and $BD_2$ be the numbers of monitored PDCCH candidates in the first and second scheduling cells, respectively, and let $CCE_1$ and $CCE_2$ be the numbers of non-overlapped CCEs monitored in the first and second scheduling cells, respectively.

In a first example for counting an allocation of PDCCH candidates/non-overlapped CCEs to search space sets per slot or per span, a UE counts the PDCCH candidates/non-overlapped CCEs based on a SCS configuration of an active DL BWP of a corresponding scheduling cell. For example, the UE counts $BD_1$ and $CCE_1$ per slot/span based on SCS configuration $\mu 1$, and counts $BD_2$ and $CCE_2$ per slot/span based on SCS configuration $\mu 2$.

In a second example, the UE counts $BD_1$ and $CCE_1$ and $BD_2$ and $CCE_2$ per slot/span based on a reference configuration, such as a minimum or maximum SCS configuration of the scheduling cells, or based on a default SCS configuration that is determined in the specifications of the system operation, for example per frequency range, or is configured by higher layers. For example, when $\mu 1=15$ kHz and $\mu 2=30$ kHz, the UE counts $BD_1$ and $CCE_1$ per slot/span based on a SCS configuration $\mu 1=15$ kHz, and then counts $BD_2$ and $CCE_2$ per two slots/spans (as a ratio between the SCS of the second scheduling cell and the SCS of the first scheduling cell is equal to 2) with SCS configuration $\mu 1=30$ kHz and the UE compares the counted PDCCH candidates and non-overlapping CCEs towards corresponding limits for SCS configuration $\mu 1=15$ kHz. Based on Tables 10.1-2 and 10.1-3 of [REF3], as a UE capability for a total number of PDCCH candidates or non-overlapping CCEs for PDCCH monitoring over two slots for SCS configuration $\mu 2=30$ kHz is larger than a corresponding UE capability for PDCCH monitoring over one slot for SCS configuration $\mu 1=15$ kHz, determining limits for a number of PDCCH candidates and a number of non-overlapping CCEs for the scheduled cell based on the scheduling cell with the smaller SCS configuration, for applying a PDCCH overbooking procedure, ensures that a UE has a capability for PDCCH monitoring according to search space sets resulting from the PDCCH overbooking procedure.

In various examples, a UE behavior to count a number of PDCCH candidates jointly across two scheduling cells of a scheduled cell can refer to either (i) a simple addition or linear combination of a first number of PDCCH candidates on a first scheduling cell and a second number of PDCCH candidates on a second scheduling cell; or (ii) a weighted combination of a first number of PDCCH candidates on a first scheduling cell and a second number of PDCCH candidates on a second scheduling cell, wherein the UE determines weighting parameters based on scaling parameters $0 \leq \alpha \leq 1$ and $0 \leq \beta \leq 1$ considered subsequently for limit on a number of PDCCH candidates or non-overlapping CCEs in a slot or span for a scheduled cell.

A UE determines a limit on a number of PDCCH candidates or non-overlapping CCEs in a slot or span for a scheduled cell jointly across multiple scheduling cells for the scheduled cell. For a first example, the limit can be a predetermined maximum/total limit on a number of PDCCH candidates, such as one based on a minimum or maximum SCS configuration of a scheduling cell, for example, min $(M_{PDCCH}^{total,slot,\mu 1}, M_{PDCCH}^{max,slot,\mu 1})$. For example, for two scheduling cells with corresponding first and second SCS configurations $\mu 1 \leq \mu 2$, the UE determines the maximum/total limit on a number of PDCCH candidates per slot based on the corresponding maximum/total limit per slot for SCS configuration $\mu 1$. The UE applies the same approach for determining maximum/total limits for the number of non-overlapping CCEs.

For a second example, the limit can be a scaled version of a predetermined maximum/total limit on a number of PDCCH candidates can apply, such as $\alpha \cdot \min(M_{PDCCH}^{total,slot,\mu 1}, M_{PDCCH}^{max,slot,\mu 1}) + \beta \cdot \min(M_{PDCCH}^{total,slot,\mu 2}, M_{PDCCH}^{max,slot,\mu 2})$, wherein scaling parameters $0 \leq \alpha \leq 1$ and $0 \leq \beta \leq 1$ can be provided by higher layers, or can be predetermined in the system operation specifications. The UE applies the same approach for determining maximum/total limits for the number of non-overlapping CCEs.

For a third example, the limit can be, another scaled version of a predetermined maximum/total limit for a number of PDCCH candidates can apply, wherein the scaling applies only to a part or component of the limit, such as $\min(M_{PDCCH}^{total,slot,\mu 1}, M_{PDCCH}^{total,slot,\mu 2}, \alpha \cdot M_{PDCCH}^{max,slot,\mu 1} \alpha \beta \cdot M_{PDCCH}^{max,slot,\mu 2})$ or $\min(\gamma \cdot M_{PDCCH}^{total,slot,\mu 1}, \rho \cdot M_{PDCCH}^{total,slot,\mu 2}, \alpha \cdot M_{PDCCH}^{max,slot,\mu 1} + \beta \cdot M_{PDCCH}^{max,slot,\mu 2})$ for scaling parameters $\gamma \geq 0$ and $\rho \geq 0$. The UE applies the same approach for determining maximum/total limits for the number of non-overlapping CCEs.

A UE (such as the UE 116) can determine a PDCCH overbooking event for a scheduled cell in a slot or span when a counted number of monitored PDCCH candidates or non-overlapping CCEs in the slot/span according to search space sets exceed(s) a corresponding limit in the slot or span that the UE computes jointly across the multiple scheduling cells. In such case, the UE applies prioritization rules among the search space sets for the scheduled cell on all multiple scheduling cells and, when an overbooking event occurs, the UE drops search space sets.

A prioritization among search space sets on multiple scheduling cells for a scheduled cell can be determined based on one or more of a priority order among search space set types, such as CSS sets and USS sets, a priority order among the multiple scheduling cells, and a priority order among search space sets of a same type and on a same scheduling cell. For example, the UE assigns a higher priority to a CSS set compared to a USS set. For another example, the UE assigns a higher priority to a first scheduling cell over a second scheduling cell, based on: (i) a cell index, such as a primary cell having larger priority than a SCell such as an sSCell; (ii) a SCS configuration for an active DL BWP of a scheduling cell, such as a scheduling cell with smaller (or larger) SCS configuration having a larger priority than a scheduling cell with larger (or smaller) SCS configuration; (iii) a priority level among scheduling cells provided by higher layer configuration; or (iv) any combination thereof. For yet another example, among search sets of a same type and on a same scheduling cell, the UE assigns a larger priority order to a search space set with smaller index.

It is noted that there can be additional criteria for determining a priority order among search space sets in a slot or span, such as: a number of PDCCH candidates in the search space sets, a maximum CCE aggregation level for PDCCH candidates corresponding to a search space set, a DCI format type/size for the search space sets, or a TCI state for CORESETs associated with the search sets such as prioritizing search space sets associated with CORESETs with a same TCI state, when a UE cannot simultaneously receive according to more than one TCI states. For example, a search set with a larger total number of PDCCH candidates can have larger priority than a search space set with a smaller total number of PDCCH candidates. For example, a first search space set with non-zero PDCCH candidates with a larger maximum CCE aggregation level, such as 16 CCEs, can have a larger priority than a search space set with a with non-zero PDCCH candidates with a smaller maximum CCE aggregation level, such as 4 CCEs. In another example, a search space set associated with a CORESET configured with a CSI-RS as its TCI state can have a larger (or smaller) priority than a search space set associated with a CORESET configured with an SSB as its TCI state. In yet another example, a search space set associated with a CORESET with lower CORESET index and/or configured in a BWP with a lower BWP index can have a larger priority.

In one realization, a UE can use one or more of the above additional criteria for determining priority order among search space sets when the search space sets have a same priority when considering only one or more of the three main elements described earlier for search space set prioritization.

For example, a selection of the above elements or criteria or combination thereof can be predetermined in the specifications for system operation. In yet another example, higher layer configuration provides an indication regarding which of the above elements or criteria or combination thereof can be used for determining SS set priority level. In a further example, a SS set priority level can be configured by higher layers.

In a first approach, a UE applies a prioritization rule in three stages. In a first example, the UE first applies a priority order according to search space set types, then according to an index of a scheduling cell order, and finally according to a search space set index. In another example, the UE applies a priority order first according to the search space set types, then according to a search space set index, and finally according to the scheduling cell index order. In a third example, the UE applies a priority order first according to the scheduling cell index order, then according to the search space set types, and finally according to the search space set index. It is also possible that the UE assumes that prioritization for CSS sets is not needed and the UE assigns PDCCH candidates and non-overlapping CCEs to CSS sets. Then, for the USS sets, the UE assigns a prioritization according to a USS set index and when a USS sets has a same index, according to a scheduling cell index wherein the prioritization according to the scheduling cell index can be defined in the specifications of the system operation, such as prioritizing the USS set on a scheduling cell with a smallest (or largest) index, or can be provided by higher layers. Alternatively, for the USS sets, the UE assigns a prioritization according to a scheduling cell index based on one of the previous approaches and, for a same scheduling cell index, according to an ascending order of the USS set index.

For another example, a UE applies the prioritization rule in one or two stages by combining some or all of the previously considered three elements. For example, the UE first applies a priority order according to search space set types, and then according to a combined priority order that includes both the scheduling cell priority and the search space set index. For example, such combined priority ordering can be configured by higher layer signaling or can be determined from a formula in the specifications, such as "combined priority level=scheduling cell priority+search space set index", or "combined priority level=scheduling cell priority*search space set index", and the like A prioritization rule/order can be predetermined in the specifications for system operation, or can be configured by higher layers.

A UE can expect that a total number of PDCCH candidates and a total number non-overlapping CCEs according to CSS sets on all scheduling cells for a scheduled cell in a slot/span for a SCS configuration as previously described do not exceed corresponding limits for the scheduled cell. The UE then allocates any remaining PDCCH candidates or non-overlapping CCEs for the scheduled cell to USS sets on the scheduling cells for the scheduled cell and, when necessary, the UE applies a search space set dropping procedure for the USS sets as previously described.

For example, when a scheduled cell is a primary cell and corresponding scheduling cells are the primary cell and a sSCell, PDCCH candidates/non-overlapping CCEs can be allocated to CSS sets on PCell and sSCell without any CSS set dropping, while search space set dropping can apply to USS sets on the primary cell or the sSCell. A determination for USS sets to drop is based on a priority among search space sets, for example considering a scheduling cell index and a search space set index as previously described.

The method 1000 as illustrated in FIG. 10 describes an example procedure for PDCCH overbooking and dropping for a primary cell that is scheduled by both the primary cell and an sSCell.

In step 1010, a UE (such as the UE 116) is configured to monitor PDCCH for scheduling on a primary cell on both the primary cell and a sSCell. In step 1020, the UE determines limits on numbers of PDCCH candidates and non-overlapping CCEs in a slot/span for the primary cell based on a minimum SCS between the primary cell and the sSCell. In step 1030, the UE allocates PDCCH candidates and non-overlapping CCEs in a slot/span for the primary cell to CSS sets on the primary cell and on the sSCell. In step 1040, the UE determines remaining numbers of PDCCH candidates and non-overlapping CCEs in the slot/span, up to the corresponding limits, for allocation to USS sets for the primary cell on the primary cell and on the sSCell. In step 1050, the UE determines a PDCCH overbooking event when a number of PDCCH candidates or non-overlapping CCEs in the slot/span for the primary cell across the USS sets on the primary cell or on the sSCell exceeds the determined corresponding remaining numbers. In response to an overbooking event, and based on a prioritization rule, the UE in step 1060 drops USS sets on the primary cell or on the sSCell with lower priority. For example, the prioritization rule among USS sets of the primary cell and the sSCell can be based on a scheduling cell priority and a search space set index, as previously described.

For another example, PDCCH overbooking can apply to both CSS sets and USS sets. Prioritization rules can apply among CSS sets on multiple scheduling cells for a scheduled cell and, when a PDCCH overbooking event exists, CSS set(s) with lower priority can be dropped.

For instance, when a scheduled cell is a primary cell and corresponding scheduling cells are the primary cell and a sSCell, the UE can drop CSS sets on the sSCell when an overbooking event occurs. A determination of CSS sets or USS sets to drop is based on a priority among search space sets, for example considering a scheduling cell index and a search space set index as previously described. In another example, the UE can drop CSS sets on the primary cell.

In another realization, a UE (such as the UE 116) allocates PDCCH candidates and non-overlapping CCEs among multiple scheduling cells for a scheduled cell based on a prioritization among the multiple scheduling cells, such as by using previously described methods. For example, the UE allocates PDCCH candidates and non-overlapping CCEs first to CSS sets and then to USS sets on a scheduling cell with larger priority and continues according to an ascending order of a scheduling cell priority. In one example, a UE can expect that a number of PDCCH candidates or of non-overlapping CCEs corresponding to CSS sets of a scheduling cell with largest priority for a scheduled cell does not exceed the limit of the PDCCH candidates or of the non-overlapping CCEs for the scheduled cell. Then, the UE does not drop any CCS sets on the scheduling cell with largest priority while the UE can drop USS sets on the scheduling cell with largest priority, or CSS sets or USS sets on scheduling cells of priority smaller than the largest one.

For example, when a scheduled cell for a UE is a primary cell and corresponding scheduling cells are the primary cell and a sSCell, the UE first allocates PDCCH candidates and non-overlapping CCEs to CSS sets on the primary cell. Then, when an PDCCH overbooking event occurs, the UE drops USS sets on primary cell or CSS sets or USS sets on the sSCell. A determination for CSS sets or USS sets to drop is based on a priority among search space sets as previously described.

In another realization, a UE (such as the UE 116) allocates PDCCH candidates and non-overlapping CCEs among multiple scheduling cells for a scheduled cell by alternating allocation to search space sets on the multiple serving cells. For example, when the has two scheduling cells for a scheduled cell and after allocation of PDCCH candidates and non-overlapping CCEs to CSS sets, the UE allocates PDCCH candidates and non-overlapping CCEs to a USS set with a smallest index on a first (or a second) scheduling cell, then the UE allocates PDCCH candidates and non-overlapping CCEs to a USS set with a smallest index on a second (or a first) scheduling cell, then the UE allocates PDCCH candidates and non-overlapping CCEs to a USS set with a next smallest index on the first (or the second) scheduling cell, and so on.

For example, a search space set with a higher priority is a CSS set with the lower index in the cell with the lower index that includes CSS sets, if any; otherwise, it is a USS set with the lower index in the cell with lower index, with at least one PDCCH candidate in overlapping PDCCH monitoring occasions/slot/span.

The method 1100 as illustrated in FIG. 11 describes an example procedure for PDCCH overbooking and dropping of search space sets when monitored PDCCH candidates and non-overlapping CCEs for a scheduled cell are jointly counted across two scheduling cells.

In step 1110, a UE (such as the UE 116) is configured with two scheduling cells for a scheduled cell. In step 1120, the UE determines a limit for PDCCH candidates and non-overlapping CCEs for the scheduled cell per slot/span based on a minimum SCS configuration among the scheduling cells. In step 1130, the UE counts a number of monitored PDCCH candidates and non-overlapping CCEs for the scheduled cell in a slot/span according to the minimum SCS jointly across the two scheduling cells. In step 1140, the UE determines a PDCCH overbooking event when the counted number of PDCCH candidates or non-overlapping CCEs for the scheduled cell in the slot/span across the two scheduling cells exceeds a corresponding limit. In response to an overbooking event, and based on a prioritization rule, the UE in step 1150 drops CSS sets or USS sets with lower priority among the search space sets on the two scheduling cells.

It is also possible that the UE does not expect to determine an overbooking event for CSS sets on one or both of the scheduling cells and then the UE determines whether there is an overbooking event after allocating PDCCH candidates and non-overlapping CCEs to CSS sets on one or both scheduling cells. For example, the prioritization rule can be based on at least one of a priority between the two scheduling cells, or on an ascending order of the search space set indices while considering the scheduling cell, such as prioritizing a search space set on a scheduling cell with a largest or smallest index, as previously described.

Although FIG. 10 illustrates the method 1000 and the FIG. 11 illustrates the method 1100 various changes may be made to FIGS. 10 and 11. For example, while the method 1000 and the method 1100 are shown as a series of steps, various steps could overlap, occur in parallel, occur in a different order, or occur multiple times. In another example, steps may be omitted or replaced by other steps. For example, steps of the method 1000 and the method 1100 can be executed in a different order.

Embodiments of the present disclosure also describe a UE procedure for search space set dropping when a UE monitors PDCCH on only one scheduling cell in a slot or span. This is described in the following examples and embodiments, such as those of FIG. 12.

Figure 12:
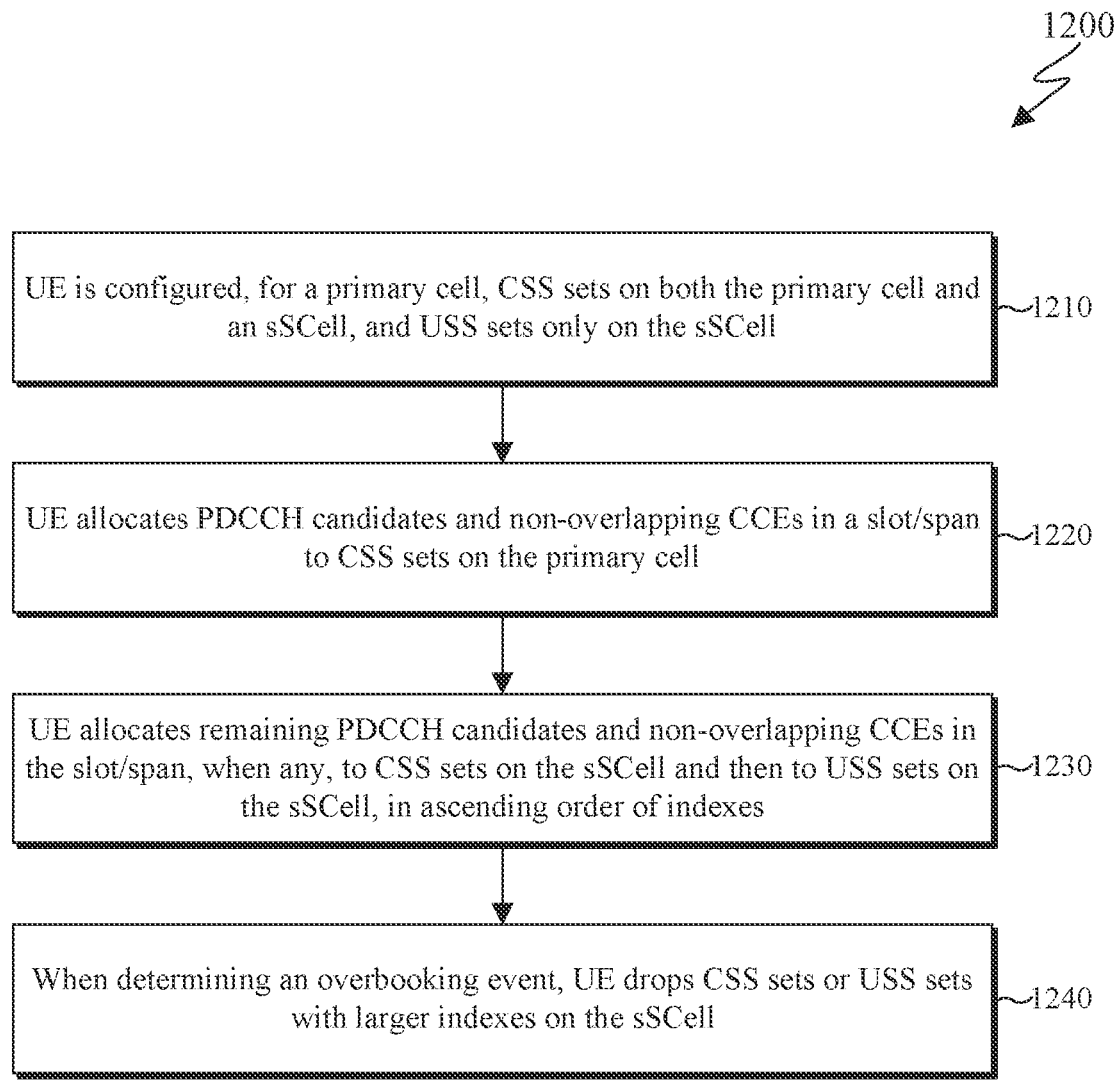
FIG. 12 illustrates an example method for a search space set dropping procedure when a schedule cell is a primary cell and scheduling cells are the primary cell and a sSCell according to embodiments of the present disclosure.

FIG. 12 illustrates an example method 1200 for a search space set dropping procedure when a schedule cell is a primary cell and scheduling cells are the primary cell and a sSCell according to embodiments of the present disclosure. The steps of the method 1200 of FIG. 12 can be performed by any of the UEs 111-116 of FIG. 1, such as the UE 116 of FIG. 3. The method 1200 is for illustration only and other embodiments can be used without departing from the scope of the present disclosure.

In certain embodiments, when a UE (such as the UE 116) is provided a configuration for search space sets on multiple scheduling cells that do not result to PDCCH monitoring occasions on multiple scheduling cells for a scheduled cell in a same slot or span, the UE can accordingly adjust a procedure for determining a PDCCH overbooking event.

A UE can determine to monitor PDCCH for a scheduled cell on only one scheduling cell in a slot, wherein the slot can be determined for example based on a smallest SCS configuration among the active DL BWPs of the multiple scheduling cells, based on: (i) a configuration by higher layers of search space sets resulting to PDCCH monitoring in a slot or span on only on one from the multiple scheduling cells, or (ii) an indication by L1/L2 signaling resulting to search space sets with PDCCH monitoring in a slot or span on only on one from the multiple scheduling cells. In one example, such determination for only one scheduling cell in a slot can apply to a time period such as multiple consecutive slots. In another example, the UE can alternate between multiple scheduling cells from a slot/span/MO to a next slot/span/MO.

In one realization, when a UE (such as the UE 116) monitors PDCCH for a scheduled cell according to USS sets on only one scheduling cell in a slot from two scheduling cells, the UE determines a PDCCH overbooking event based only on a number of PDCCH candidates or non-overlapping CCEs corresponding to either (i) CSS sets on a first scheduling cell, and CSS sets on a second scheduling cell, and USS sets on a first scheduling cell; or (ii) CSS sets on a first scheduling cell, and CSS sets on a second scheduling cell, and USS sets on a second scheduling cell.

For example, the UE does not drop USS sets on both a first scheduling cell and on a second scheduling cell in a same slot/span for a scheduled cell.

For another example, when a scheduled cell is a primary cell and scheduling cells are the primary cell and a sSCell, a UE can allocate PDCCH candidates and non-overlapping CCEs to CSS sets on the primary cell and CSS sets on the sSCell in a slot/span, allocate remaining PDCCH candidates and non-overlapping CCEs, when any, to USS sets with lower indexes on the primary cell (or the sSCell) in the slot/span, and drop USS sets with larger indexes on the primary cell (or the sSCell) in the slot/span. In such case, the UE does not consider USS sets on the sSCell (or the primary cell) in the slot/span and there is no need for prioritization among USS sets on the primary cell and USS sets on the sSCell.

The method 1200 as illustrated in FIG. 12 describes an example procedure for a search space set dropping procedure when a scheduled cell is a primary cell and scheduling cells are the primary cell and a sSCell, wherein USS sets for the primary cell are configured only on the sSCell.

In step 1210, a UE (such as the UE 116) is configured, for a scheduled cell that is a primary cell, CSS sets on both the primary cell and an sSCell, and USS sets only on the sSCell. In step 1220, the UE allocates PDCCH candidates and non-overlapping CCEs in a slot/span to CSS sets on the primary cell. In step 1230, the UE allocates remaining PDCCH candidates and non-overlapping CCEs in the slot/span, when any, to CSS sets on the sSCell and then to USS sets on the sSCell, in ascending order of corresponding indexes. In response to a PDCCH overbooking event, the UE in step 1240 drops CSS set on the sSCell or USS sets on the sSCell with larger search space set indexes.

For example, CSS sets on a first scheduling cell, such as the primary cell, and CSS sets on the second scheduling cell, such as the sSCell, do not both occur in any slot or span. Then, the UE determines a PDCCH overbooking event based only on a number of PDCCH candidates or non-overlapping CCEs corresponding to either (i) CSS sets on the first scheduling cell, and USS sets on the first scheduling cell, and USS sets on the second scheduling cell; or (ii) CSS sets on the second scheduling cell, and USS sets on the first scheduling cell, and USS sets on the second scheduling cell.

For another example, the UE assigns higher priority to USS sets of a primary cell than to CSS sets of a sSCell. In a further example, the UE assigns higher priority to USS sets of a sSCell than to CSS sets of a primary cell.

In certain embodiments, when a scheduled cell is a primary cell and scheduling cells are the primary cell and an sSCell, the UE allocates PDCCH candidates and non-overlapping CCEs only to CSS sets on the primary cell (or sSCell), and then allocates remaining PDCCH candidates and non-overlapping CCEs, when any, to USS sets on the primary cell or on the sSCell based on search space set prioritization rules as previously described.

For example, a UE (such as the UE 116) monitors PDCCH for a scheduled cell in any slot either according to search space sets of a first scheduling cell or according to search space sets of a second scheduling cell. Then, when applicable, the UE can perform a procedure for dropping search space sets as when there is only one scheduling cell and, for example, the scheduled cell is a primary cell.

For another example, when a scheduled cell is a primary cell and scheduling cells are the primary cell and a sSCell, the UE can be configured only CSS sets on the primary cell and both CSS sets and USS sets on the sSCell. For example, CSS sets with Type-0/0A/½ PDCCH and possibly Type-3 PDCCH or Type-4 PDCCH (CSS sets for multicast services) can be configured on the primary cell. For example, CSS sets with Type-3 PDCCH or Type-4 PDCCH can be configured on the sSCell. PDCCH candidates and non-overlapping CCEs for CSS sets on both the PCell/PSCell and the sSCell can be within corresponding limits in a slot/span as previously described. The UE allocates remaining PDCCH candidates and non-overlapping CCEs, when any, to USS sets on the sSCell in increasing order of USS set indexes in the slot/span. When the UE determines an overbooking event for the primary cell, the UE can drop USS sets on the sSCell with larger indexes.

For yet another example, when a scheduled cell for a UE is a primary cell and scheduling cells are the primary cell and a sSCell, the UE can be configured CSS sets only on the primary cell and configured USS sets only on the sSCell. In such a case, the UE allocates PDCCH candidates and non-overlapping CCEs in a slot to the CSS sets on the primary cell, and then allocates remaining PDCCH candidates and non-overlapping CCEs, when any, to the USS sets on the sSCell in increasing order of a search space set index. The UE can drop USS sets on the sSCell with larger indexes when the UE determines an overbooking event in the slot/span. Such a PDCCH dropping method can apply at least when the UE counts a number of PDCCH candidates and non-overlapping CCEs jointly across the primary cell and the sSCell, as previously described. When the UE counts a number of PDCCH candidates and non-overlapping CCEs separately for the primary cell and the sSCell, an overbooking event for primary cell may not be expected or PDCCH overbooking and dropping of search space sets can apply at least for USS sets on the sSCell such as when scaling parameter(s) $0 \leq \alpha \leq 1$ or $0 \leq \beta \leq 1$ are applied to the allocation of PDCCH candidates or non-overlapping CCEs.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure further describe a PDCCH overbooking and dropping for a secondary cell "sSCell" that schedules a PCell/PSCell.

In certain embodiments, a UE (such as the UE 116) can be configured a primary cell as a scheduled cell from scheduling cells that are the primary cell and a "sSCell". The UE can be configured CSS sets on the sSCell, such as Type-3 PDCCH CSS sets or Type-4 CSS sets (for scheduling multicast PDSCH), to offload such CSS sets from the primary cell, leading to a need to support overbooking on the sSCell. The UE can determine a PDCCH overbooking event on the sSCell based on CSS sets or USS sets configured on the sSCell for scheduling on the primary cell. Accordingly, the UE can drop search space sets on the sSCell according to prioritization rules.

In one example, for a UE, the sSCell can be only self-carrier scheduled (the UE cannot be scheduled on the sSCell from any other cell).

A UE can count a number of PDCCH candidates and non-overlapping CCEs for CSS sets and USS sets on the sSCell (as a scheduled cell) based on a slot/span corresponding to the sSCell and with respect to a SCS configuration for an active DL BWP of the sSCell. The UE compares the number of PDCCH candidates and non-overlapping CCEs for the sSCell in a slot/span with a corresponding limit in the slot/span for the SCS configuration of the active BWP of the sSCell.

The UE can determine a PDCCH overbooking event when a number of counted PDCCH candidates or non-overlapping CCEs for the sSCell in a slot/span exceeds a corresponding limit in the slot/span. Several approaches can be considered. In a first approach, the UE counts all CSS sets on the sSCell in the slot/span towards the number of monitored PDCCH candidates and non-overlapping CCEs for the sSCell as a scheduled cell in the slot/span.

In a second approach, the UE splits a number of PDCCH candidates and a number of non-overlapping CCEs for CSS sets on the sSCell, or generally on any scheduling cell, among the scheduled cells for the sSCell, or generally for the scheduling cell. For example, denote by $M_{PDCCH}^{CSS,cell,\mu}$ and $M_{PDCCH}^{CSS,cell,\mu}$ a number of PDCCH candidates and a number of non-overlapping CCEs, respectively, for CSS sets on a cell that is a scheduling cell for $N_{cells}^{DL,\mu}$ scheduled cells. Herein, $N_{cells}^{DL,\mu}$ can be same as or different from a number of downlink/scheduled cells that have a scheduling cell with SCS configuration $\mu$. Then, first (or last) $M_{PDCCH}^{CSS,cell,\mu}$ $\mod(N_{cells}^{DL,\mu})$ scheduled cells can each be allocated $\lceil M_{PDCCH}^{CSS,cell,\mu}/N_{cells}^{DL,\mu} \rceil$ PDCCH candidates and last (or first) $N_{cells}^{DL,\mu} - M_{PDCCH}^{CSS,cell,\mu}$ $\mod(N_{cells}^{DL,\mu})$ scheduled cells can each be allocated $\lfloor M_{PDCCH}^{CSS,cell,\mu}/N_{cells}^{DL,\mu} \rfloor$ PDCCH candidates. Similar, first (or last) $C_{PDCCH}^{CSS,cell,\mu}$ $\mod(N_{cells}^{DL,\mu})$ scheduled cells can each be allocated $\lceil C_{PDCCH}^{CSS,cell,\mu}/N_{cells}^{DL,\mu} \rceil$ non-overlapping CCEs and last (or first) $N_{cells}^{DL,\mu} - C_{PDCCH}^{CSS,cell,\mu}$ $\mod(N_{cells}^{DL,\mu})$ scheduled cells can each be allocated $\lfloor C_{PDCCH}^{CSS,cell,\mu}/N_{cells}^{DL,\mu} \rfloor$ non-overlapping CCEs, wherein $\lceil\ \rceil$ is the ceiling function, $\lfloor\ \rfloor$ is the floor function, and $\mod(\ )$ is the modulo function. A simpler but sub-optimal alternative is to consider that $\lceil M_{PDCCH}^{CSS,cell,\mu}/N_{cells}^{DL,\mu} \rceil$ PDCCH candidates and $\lceil C_{PDCCH}^{CSS,cell,\mu}/N_{cells}^{DL,\mu} \rceil$ PDCCH candidates for each scheduled are used for PDCCH monitoring for the CSS sets on the scheduling cell. PDCCH candidates and non-overlapping CCEs for each scheduled cell that are considered to be for CSS sets on the scheduling cell are subtracted from corresponding PDCCH candidates and non-overlapping CCEs for scheduled cell and only the remaining ones are available for USS sets for the scheduled cell.

In a third approach, a CSS set on a scheduled cell corresponds to a scheduled cell based on a "target cell" parameter in the CSS set configuration, that determines a cell that the UE may consider that PDCCH candidates and non-overlapped CCEs for a CSS set are to be counted for.

For example, the UE can use additional criteria to determine search space set prioritization rules. For example, (CSS sets or) USS sets on the sSCell that are shared/linked with a primary cell can have higher priority level compared with (CSS sets or) USS sets on the sSCell that are not shared with the primary cell.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application may be read as implying that any particular element, step, or function is an essential element that must be included in the claims scope. The scope of patented subject matter is defined by the claims.

What is claimed is:

1. A method for receiving physical downlink control channels (PDCCHs), the method comprising:
   receiving information for scheduling on a primary cell from the primary cell and from a secondary cell;
   identifying a number of PDCCH candidates on the primary cell in a slot and a number of non-overlapping control channel elements (CCEs) on the primary cell in the slot based on the information;
   identifying, for scheduling on the primary cell from the primary cell, that at least one of:
      the number of PDCCH candidates exceeds a first number of PDCCH candidates, and
      the number of non-overlapping CCEs exceeds a first number of non-overlapping CCEs;
   canceling PDCCH receptions corresponding to UE-specific search space (USS) sets for scheduling on the primary cell from the primary cell; and
   receiving all PDCCHs for scheduling on the primary cell from the secondary cell,
   wherein PDCCH candidates on the primary cell are with a first subcarrier spacing (SCS) configuration,
   wherein PDCCH candidates on the secondary cell are with a second SCS configuration, and
   wherein the slot corresponds to a smaller of the first SCS and the second SCS.

2. The method of claim 1, wherein the secondary cell is activated and has an active downlink bandwidth part (DL BWP) that is not a dormant DL BWP.

3. The method of claim 1, wherein: the first number of PDCCH candidates is associated with a scaling factor $\alpha$ and the first number of non-overlapping CCEs is associated with the scaling factor $\alpha$, and
   the scaling factor $\alpha$ is provided by higher layer signaling.

4. The method of claim 1, wherein:
   the first number of PDCCH candidates is equal to $$\alpha \cdot \min(M_{PDCCH}^{total,slot,\mu 1}, M_{PDCCH}^{max,slot,\mu 1}),$$

the first number of non-overlapping CCEs is equal to $$\alpha \cdot \min(C_{PDCCH}^{total,slot,\mu 1}, C_{PDCCH}^{max,slot,\mu 1}),$$

$M_{PDCCH}^{total,\ slot,\ \mu 1}$ and $C_{PDCCH}^{total,\ slot,\ \mu 1}$ are, respectively, a total number of PDCCH candidates and a total number of non-overlapping CCEs in a slot on the primary cell, $M_{PDCCH}^{max, slot, \mu1}$ and $C_{PDCCH}^{max, slot, \mu1}$ are, respectively, a maximum number of PDCCH candidates and a maximum number of non-overlapping CCEs in the slot on the primary cell, and μ1 is a sub-carrier spacing configuration for the slot of the primary cell.

5. The method of claim 1, further comprising:
receiving second information for scheduling on the secondary cell from the secondary cell;
identifying, based on the second information, that at least one of:
 a number of PDCCH candidates on the secondary cell in a slot exceeds a second predetermined number of PDCCH candidates, and
 a number of non-overlapping CCEs on the secondary cell in the slot exceeds a second predetermined number of non-overlapping CCEs; and
canceling PDCCH receptions corresponding to UE-specific search space (USS) sets for scheduling on the secondary cell from the secondary cell.

6. The method of claim 1, further comprising:
receiving:
 information for common search space (CSS) sets for PDCCH receptions only on the primary cell,
 a PDCCH according to the CSS sets, wherein the PDCCH provides a downlink control information (DCI) format that includes cyclic redundancy check (CRC) bits scrambled by a group radio network temporary identifier (G-RNTI), and
 a multicast physical downlink shared channel (PDSCH) on the primary cell, wherein the multicast PDSCH is scheduled by the DCI format.

7. The method of claim 1, further comprising:
receiving second information for third search space sets for scheduling on the primary cell from a third cell,
determining the secondary cell is deactivated or has an active downlink bandwidth part (DL BWP) that is a dormant DL BWP, and
receiving a PDCCH according to the third search space sets for scheduling on the primary cell.

8. A user equipment (UE) comprising:
a transceiver configured to receive information for scheduling on a primary cell from the primary cell and from a secondary cell; and
a processor operably coupled to the transceiver, the processor configured to:
 identify a number of physical downlink control channel (PDCCH) candidates on the primary cell in a slot and a number of non-overlapping control channel elements (CCEs) on the primary cell in the slot based on the information; and
 identify, for scheduling on the primary cell from the primary cell, that at least one of:
  the number of PDCCH candidates exceeds a first number of PDCCH candidates, and
  the number of non-overlapping CCEs exceeds a first number of non-overlapping CCEs; and
 cancel PDCCH receptions corresponding to UE-specific search space (USS) sets for scheduling on the primary cell from the primary cell,
wherein the transceiver is further configured to receive all PDCCHs for scheduling on the primary cell from the secondary cell,
wherein PDCCH candidates on the primary cell are with a first subcarrier spacing (SCS) configuration,
wherein PDCCH candidates on the secondary cell are with a second SCS configuration, and wherein the slot corresponds to a smaller of the first SCS and the second SCS.

9. The UE of claim 8, wherein the secondary cell is activated and has an active downlink bandwidth part (DL BWP) that is not a dormant DL BWP.

10. The UE of claim 8, wherein: the first number of PDCCH candidates is associated with a scaling factor α and the first number of non-overlapping CCEs is associated with the scaling factor α, and
the scaling factor α is provided by higher layer signaling.

11. The UE of claim 8, wherein:
the first number of PDCCH candidates is equal to $$\alpha \cdot \min(M_{PDCCH}^{total,slot,\mu1} M_{PDCCH}^{max,slot,\mu1})$$

the first number of non-overlapping CCEs is equal to $$\alpha \cdot \min(M_{PDCCH}^{total,slot,\mu1} M_{PDCCH}^{max,slot,\mu1})$$

$M_{PDCCH}^{total, slot, \mu1}$ and $C_{PDCCH}^{total, slot, \mu1}$ are, respectively, a total number of PDCCH candidates and PDCCH a total number of non-overlapping CCEs in a slot on the primary cell,
$M_{PDCCH}^{max, slot, \mu1}$ and $C_{PDCCH}^{max, slot, \mu1}$ are, respectively, a maximum number of PDCCH candidates and a maximum number of non-overlapping CCEs in the slot on the primary cell, and
μ1 is a sub-carrier spacing configuration for the slot of the primary cell.

12. The UE of claim 8, wherein:
the transceiver is further configured to receive second information for scheduling on the secondary cell from the secondary cell;
the processor is further configured to identify, based on the second information, that at least one of:
 a number of PDCCH candidates on the secondary cell in a slot exceeds a second predetermined number of PDCCH candidates, and
 a number of non-overlapping CCEs on the secondary cell in the slot exceeds a second predetermined number of non-overlapping CCEs;
the transceiver is further configured to cancel PDCCH receptions corresponding to UE-specific search space (USS) sets for scheduling on the secondary cell from the secondary cell.

13. The UE of claim 8, wherein the transceiver is further configured to receive:
information for common search space (CSS) sets for PDCCH receptions only on the primary cell,
a PDCCH according to the CSS sets, wherein the PDCCH provides a downlink control information (DCI) format that includes cyclic redundancy check (CRC) bits scrambled by a group radio network temporary identifier (G-RNTI), and
a multicast physical downlink shared channel (PDSCH) on the primary cell, wherein the multicast PDSCH is scheduled by the DCI format.

14. The UE of claim 8, wherein:
the transceiver is further configured to receive second information for third search space sets for scheduling on the primary cell from a third cell,
the processor is further configured to determine the secondary cell is deactivated or has an active downlink bandwidth part (DL BWP) that is a dormant DL BWP, and
the transceiver is further configured to receive a PDCCH according to the third search space sets for scheduling on the primary cell.

15. A base station comprising:

a transceiver configured to transmit:

information for scheduling on a primary cell from the primary cell and from a secondary cell, wherein the information indicates a number of physical downlink control channel (PDCCH) candidates on the primary cell in a slot and a number of non-overlapping control channel elements (CCEs) on the primary cell in the slot; and all PDCCHs for scheduling on the primary cell from the secondary cell, wherein PDCCH candidates on the primary cell are with a first subcarrier spacing (SCS) configuration, wherein PDCCH candidates on the secondary cell are with a second SCS configuration, and wherein the slot corresponds to a smaller of the first SCS and the second SCS.

16. The base station of claim 15, wherein the secondary cell is activated and has an active downlink bandwidth part (DL BWP) that is not a dormant DL BWP.

17. The base station of claim 15, wherein:

a first number of PDCCH candidates is associated with a scaling factor $\alpha$ and a first number of non-overlapping CCEs is associated with the scaling factor $\alpha$, and the scaling factor $\alpha$ is provided by higher layer signaling.

18. The base station of claim 15, wherein:

a first number of PDCCH candidates is equal to $$\alpha \cdot \min(M_{PDCCH}^{total, slot, \mu 1} M_{PDCCH}^{max, slot, \mu 1}),$$

a first number of non-overlapping CCEs is equal to $$(M_{PDCCH}^{total, slot, \mu 1} M_{PDCCH}^{max, slot, \mu 1})$$

$M_{PDCCH}^{total, slot, \mu 1}$ and $C_{PDCCH}^{total, slot, \mu 1}$ are, respectively, a total number of PDCCH candidates and a total number of non-overlapping CCEs in a slot on the primary cell, $M_{PDCCH}^{max, slot, \mu 1}$ and $C_{PDCCH}^{max, slot, \mu 1}$ are, respectively, the maximum number of PDCCHs and the maximum number of non-overlapping CCEs in the slot on the primary cell, and $\mu 1$ is a sub-carrier spacing configuration for the slot of the primary cell.

\* \* \* \* \*